US011286902B2

(12) United States Patent
McNatt et al.

(10) Patent No.: US 11,286,902 B2
(45) Date of Patent: Mar. 29, 2022

(54) WAVE-ENERGY EXTRACTION

(71) Applicant: MOCEAN ENERGY LTD, Edinburgh (GB)

(72) Inventors: James Cameron McNatt, Edinburgh (GB); Christopher Heinz Retzler, Edinburgh (GB)

(73) Assignee: MOCEAN ENERGY LTD., Edinburgh (GB)

( * ) Notice: Subject to any disclaimer, the term of this patent is extended or adjusted under 35 U.S.C. 154(b) by 0 days.

(21) Appl. No.: 16/644,666

(22) PCT Filed: Sep. 6, 2018

(86) PCT No.: PCT/GB2018/052528
§ 371 (c)(1),
(2) Date: Mar. 5, 2020

(87) PCT Pub. No.: WO2019/048865
PCT Pub. Date: Mar. 14, 2019

(65) Prior Publication Data
US 2021/0108606 A1    Apr. 15, 2021

(30) Foreign Application Priority Data
Sep. 6, 2017   (GB) ...................... 1714358

(51) Int. Cl.
*F03B 13/20*    (2006.01)
*F03B 13/22*    (2006.01)

(52) U.S. Cl.
CPC .............. *F03B 13/20* (2013.01); *F03B 13/22* (2013.01)

(58) Field of Classification Search
CPC .................................. F03B 13/20; F03B 13/22
USPC ..................................... 60/497–500, 502–506
See application file for complete search history.

(56) References Cited

U.S. PATENT DOCUMENTS

| 4,172,689 | A | | 10/1979 | Thorsheim | |
| 4,179,886 | A | * | 12/1979 | Tsubota | ................ F03B 13/184 60/398 |
| 7,525,212 | B1 | * | 4/2009 | Catlin | ................... F03B 13/188 290/53 |

(Continued)

FOREIGN PATENT DOCUMENTS

| CN | 1080692 A | 1/1994 |
| CN | 101498273 A | 8/2009 |

(Continued)

OTHER PUBLICATIONS

International Search Report and Written Opinion of the ISA for PCT/GB2018/052528, dated Feb. 4, 2019, 17 pages.

(Continued)

*Primary Examiner* — Hoang M Nguyen
(74) *Attorney, Agent, or Firm* — Nixon & Vanderhye P.C.

(57) ABSTRACT

A wave energy extractor such as a wave energy converter (WEC) or wave energy dissipater has a floating body with a channel at the fore or aft end, the channel having a sloping base, side walls, in some embodiments an end wall, and an opening for receiving waves. Resonance effects enhance the energy extracted from the waves and transferred to the (Continued)

floating body. Embodiments include WECs such as hinged raft WECs and heaving buoy WECs. The channels may also be fitted to a floating breakwater.

22 Claims, 24 Drawing Sheets

(56) References Cited

U.S. PATENT DOCUMENTS

| | | | |
|---|---|---|---|
| 2008/0088132 A1* | 4/2008 | Laube von Laubenfels | ............... F03B 13/14 290/53 |
| 2013/0221672 A1* | 8/2013 | Costas | ............... F03B 13/22 290/53 |
| 2015/0210362 A1* | 7/2015 | Ruiz Diez | ............... B63B 1/24 114/61.1 |

FOREIGN PATENT DOCUMENTS

| | | |
|---|---|---|
| CN | 101526062 A | 9/2009 |
| CN | 106087857 | 11/2016 |
| EP | 0 950 812 | 10/1999 |
| FR | 2 346 571 | 10/1977 |
| FR | 2 548 739 | 1/1985 |
| GB | 2530011 | 3/2016 |
| WO | 2008/122867 | 10/2008 |
| WO | 2010/108828 | 9/2010 |
| WO | 2012/106558 A2 | 8/2012 |

OTHER PUBLICATIONS

McIver et al., "Trapped modes in the water-wave problem for a freely floating structure", Journal of Fluid Mechanics, vol. 558, 2006, pp. 53-67.

McIver et al., "Trapping structures in the three-dimensional water-wave problem", Journal of Fluid Mechanics, vol. 484, 2003, pp. 283-301.

Ursell, F., "Trapping modes in the theory of surface waves", Mathematical Proceedings of the Cambridge Philosophical Society, vol. 47, issue 2, 1951, pp. 347-358.

Wolgamot, et al., "Radiation, trapping and near-trapping in arrays of floating truncated cylinders", Journal of Engineering Mathematics, 91, 2015, pp. 17-35.

Wolgamot, et al., "Experimental observation of a near-motion-trapped mode: free motion in heave with negligible radiation", Journal of Fluid Mechanics, vol. 786, 2016, 11 pages.

Ursell, F., "The effect of a fixed vertical barrier on surface waves in deep water", Mathematical Proceedings of the Cambridge Philosophical Society, 43-3, received Nov. 26, 1946, pp. 374-382.

Miles, J. W. et al., "Helmholtz resonance of harbours", Journal of Fluid Mechanics, vol. 67, part 3, 1975, pp. 445-464.

Parsons, N. F. et al., "Scattering of water waves by submerged curved plates and by surface-piercing flat plates", Applied Ocean Research, 16, 1994, pp. 129-139.

Parsons, N. F. et al. "Scattering of water waves by an inclined surface piercing plate", The Quarterly Journal of Mechanics and Applied Mathematics, 52(4), 1998, pp. 513-524.

* cited by examiner

WAVE-ENERGY EXTRACTION

This application is the U.S. national phase of International Application No. PCT/GB2018/052528 filed 6 Sep. 2018, which designated the U.S. and claims priority to GB Patent Application No. 1714358.7 filed 6 Sep. 2017, the entire contents of each of which are hereby incorporated by reference.

FIELD OF THE INVENTION

The invention relates to the field of extracting energy from ocean waves, either to convert wave energy to another human-usable form (e.g. electricity) or in some embodiments to dissipate the energy (e.g. in a breakwater).

BACKGROUND TO THE INVENTION

The field of wave energy extraction, particularly wave energy converters (WECs), is well developed. However, there remains an unmet need for wave energy extraction devices which are more efficient in extracting energy from waves and which are more reliable for long term operation.

Accordingly, the invention seeks to provide improved apparatus to extract wave-energy, including wave-energy converters and wave-energy dissipaters

SUMMARY OF THE INVENTION

According to a first aspect of the invention there is provided a wave energy extractor comprising a floating body having a wave receiving channel, the wave receiving channel having a sloping base and a wave receiving opening, both the sloping base and the wave receiving opening being provided between opposing first and second side walls, wherein at least part of the sloping base extends beneath a still water surface in a still water rest position.

The wave energy extractor is typically a wave energy converter (WEC) or wave energy dissipater. We have surprisingly discovered that this configuration can provide greater wave energy extraction (conversion, or dissipation) than would be the case without the wave receiving channel, resulting from resonance effects discussed further below and/or from the effects of the mass of water retained by the channel.

Typically, the sloping base extends from an end wall of the wave receiving channel, the wave receiving channel being at least partly defined by the first and second side walls, the sloping base and the end wall. The end wall is typically a fore or aft end wall. The end wall may be a vertical or sloping wall. There may be one or more said wave receiving channel which is a fore wave receiving channel and one or more said wave receiving channel which is an aft wave receiving channel (which may be part of the same floating body, or joined (e.g. hinged) first and second floating bodies, or optionally, at the fore and aft ends of a plurality of joined (e.g. hinged) floating bodies).

An advantage to providing channels (whether or fore and/or aft) is that they act to increase wave excitation forces. As a result of the depth to which it extends below the still water line, a channel constrains additional fluid, thereby increasing the mass of the overall system and, as a result, changing the resonant behaviour of the system (formed by the water, waves and the wave energy extractor). The shape of the channels will have an effect on the volume (and hence the mass) of fluid that may be constrained by the channels, and therefore the effect of the channels on the resonant behaviour of the system.

Accordingly, the choice of the geometric parameters (e.g. width, depth, angle of slope of the base etc.) of the respective wave receiving channels will be influenced by the expected environment that the wave energy extractor is intended for use in, and the kinematics of the waves (e.g. frequency, wave height and water depth) expected in that environment.

It may be that the said wave receiving channel has a channel resonant frequency at least partly defined by the sloping base and/or the first and second side walls (and/or the end wall, where provided), and wherein the said channel is configured to cause resonance (typically within the channel) of waves received by the wave receiving channel through the wave receiving opening and having the said channel resonant frequency. It may be that the said wave receiving channel is configured to cause resonance of the waves, within a wavelength range, that are received through the wave receiving opening.

Typically, resonance of the received waves increases the quantity of wave energy extracted (and so converted or dissipated) (e.g. the quantity of power generation or storage by the power generation or storage apparatus). Typically, the resonance increases the force and/or work done on the floating body, in a downward/upward (heave), forward/backward (surge), and/or rotational (pitch) direction, by the waves, compared to what the force and/or work done would be in the absence of the channel with a sloping base (e.g. if there was no channel, or if there was a channel with a base which is horizontal in the still water rest position).

The range of wavelengths for which there are resonance effects (leading to enhanced forces on the floating body), and the peak wavelength (the wavelength corresponding to the channel resonant frequency), are defined by the configuration of the wave receiving channel, e.g. by its breadth, depth (relative to the water line in a still water rest position) and slope profile. The range of wavelengths and the peak wavelength can be determined empirically or through simulation for a given channel configuration.

Without wanting to be bound by theory, we propose that these resonance effects are wave trapped modes.

In embodiments of a wave energy extractor containing relatively deep channels (e.g. at least as deep as broad) the wave resonance effects are less significant that those with relatively shallow channels. That is, the wave height inside the channel is closer to the wave height in the ambient wave field outside the channel.

When there is channel resonance, the increase in wave heights (in the channel) increases forces. This can be applied in an advantageous way through the location of the wave channel (whether forward or aft).

In some embodiments, resonance effects in the fore and/or aft channel increase wave excitation forces. In other embodiments, a more significant factor is the effect of added mass of the fluid constrained by the channels on the system. These two forces (wave excitation and inertial) affect the overall dynamics and motion of the bodies of the wave energy extractor.

Typically, at least a portion of the wave receiving opening is provided at an end of the wave receiving channel. Typically, the said end of the wave receiving channel at which the said at least a portion of the wave receiving opening is provided is a first end of the wave receiving channel. Typically, the end wall is provided at a second end of the wave receiving channel opposite the first end. The first end of the wave receiving channel may coincide with the (fore or aft) end of the floating body.

Typically, the sloping base is configured to convert wave energy from waves received through the wave receiving opening to another form, for example to drive (e.g. electrical or hydraulic) power generation or storage apparatus, or to carry out another activity (e.g. driving a pump (e.g. a water pump) or compressor or operating a desalinator). In the case of a WEC, wave energy may be converted to electrical power or fluid power, for example. In the case of a wave energy dissipater (e.g. a floating breakwater), a proportion of wave energy is dissipated (and wave energy is not used to generate power nor stored for subsequent use).

Although the sloping base may extend from above the still water surface to below the still water surface in a still water rest position, this is not essential. The sloping base may be entirely below the still water surface in the still water rest position.

Although the inventors do not wish to be bound by theory, it is generally expected that, in embodiments of a wave energy extractor comprising both a fore wave receiving channel and an aft wave receiving channel, wherein the sloping base of the fore wave receiving channel has a shallower slope than the sloping base of the aft wave receiving channel, the wave resonant effects of the aft wave receiving channel are less significant than the wave resonant effects of the fore wave receiving channel.

In some embodiments of the invention, the fore wave receiving channel may extend to a depth which is different to (where greater or lesser than) the depth to which the aft wave receiving channel extends.

In some embodiments of the invention, the fore wave receiving channel may have a sloping base with a slope of a different angle to (whether greater or lesser) than the slope of the sloping base of the aft wave receiving channel.

It may be that the sloping base is conical or frustoconical. The sloping base may be flat.

It may be that the sloping base is longer in a direction along the length of the channel (e.g. a longitudinal axis of the channel) than it is wide. It may be that the sloping base is more than three times, or more than four times longer than it is wide. Typically, the sloping base is less than six times longer than it is wide. The length of the channel is typically aligned with the direction of travel of incident waves in use.

It may be that the ratio of the length of the sloping base, relative to the width of the channel, to the average distance between the opposing first and second side walls, is in the range 1 to 4.

It may be that the ratio of the depth of the second end of the sloping base, relative to the still water rest position, to the average distance between the opposing first and second side walls, is in the range of 0.2 to 1.

It may be that the wave energy extractor comprises a plate, wherein the sloping base is defined by the plate. Side walls may be joined to the plate.

It may be that at least a portion of each of the said side walls is submerged below the still water surface in the still water rest position.

It may be that at least a portion of each of the said side walls extends above the still water surface in the still water rest position.

Typically, the distance between the side walls (the beam, b) is in the range of 0.8-16 m.

Where the wave energy extractor is located, where waves have peak periods of 9-10 s, (for example in the Atlantic Ocean) the distance between the side walls is typically in the range of 2-16 m. Where the wave energy extractor is located where waves have peak periods of 5-8 s (for example in the North Sea), the distance between the side walls is typically in the range of 0.8-10 m. However, optionally, the distance between the side walls may be substantially less, for example, the distance between the side walls may be in the range 0.25-1 m, or in the range 0.5-0.75 m. Typically the distance between the side walls is at least 0.2 m.

Typically, the sloping base extends upwards at a mean angle of 10° to 60° relative to the horizontal, when the wave energy extractor is at rest (in a still water rest position). Optionally, the sloping base may extend upwards at a mean angle of 10° to 70° relative to the horizontal, when the wave energy extractor is at rest (in a still water rest position). Optionally, the sloping base may be substantially horizontal, (i.e. it may be in substantially the same plane as the still water line), when the wave energy extractor is at rest (in a still water rest position).

The sloping base may extend upwards (from the first end towards the second end) at a mean angle of less than 50°, less than 40°, less than 30° or in some embodiments, less than 20°. Typically, the sloping base extends upwards at a mean angle of at least 10°. The sloping base may comprise one or more curved portions. The sloping base may comprise one or more flat regions in addition to sloping regions, such that there is a net slope. The sloping base may comprise a first, flat or sloping, region and a second region, between the first region and the second end, which section region is more sloped than the first region.

Nevertheless, although the resonance effects are diminished, at least in theory, if the sloping base extends upwards at a greater mean angle, or if the sloping base is deeper in the water due to a deep end wall, we have found that a wave channel with a steeper base results in the predictions of linear wave theory more closely matching physical reality. In such circumstances, one effect of the wave channel is to constrain a greater volume (and therefore mass) of water, and the mass of water acts on the wave energy extractor, providing a useful inertial force. It may provide a surface against which wave diffraction can occur. This increases the wave excitation force (or the moment).

Accordingly, if may be that the sloping base extends upwards at an angle of at least 15° or at least 20° or at least 25° or even at least 45°.

In some embodiments the end wall extends upwards vertically (e.g. at a mean angle of approximately 90° to the horizontal when in use), however in some embodiments the end wall may extend upwards (from the upper end of the sloping base) at a mean angle of less than 90°, less than 80° or less than 70°. Typically, the end wall extends upwards (from the upper end of the sloping base) at a mean angle of at least 50° or at least 60°. The angle we refer to is relative to the horizontal, when the wave energy extractor is at rest.

The end wall (whether sloping or vertical) also contributes to the depth of the channel, contributing to the channel containing a greater mass of water which, as described, above, interacts with the moving wave energy extractor, providing a surface against which wave diffraction occurs, thereby increasing wave excitation forces and providing a useful inertial force.

It may be that the lowest point of the wave channel (at the first end, opposite the end wall where present) is at a depth of at least 0.5, or at least 1, or at least 2 times the channel width, when the wave energy extractor is in the still water rest position.

It may be that the wave energy extractor according to the invention is installed in a body of water at a location receiving waves which have an annually averaged mean period, wherein the ratio of distance between the side walls to the wavelength corresponding to said mean period is in the range 1:10 to 1:50 (optionally in the range 1:15 to 1:40).

We have found that the surge, heave and pitch forces on the floating body are at a maximum at a wavelength of 10 to 50 times the distance between the side walls. We have found this ratio gives the best resonance effects leading to improved power generation.

It may be that the said sloping base is a first sloping base and the wave receiving channel is a first wave receiving channel, wherein the wave energy extractor further comprises a second wave receiving channel comprising a second sloping base provided between the first said side wall and a third side wall, the said first and third side walls opposing each other, wherein at least part of the second sloping base extends (typically from above a still water surface to) beneath a still water surface in a still water rest position.

It may be that the second sloping base is integrally formed with the first said sloping base.

Typically, the second wave receiving channel has a wave receiving opening, typically between the first and third side walls. Typically, at least a portion of the wave receiving opening is provided at an end of the second wave receiving channel. Typically, the said end of the second wave receiving channel at which the said at least a portion of the wave receiving opening is provided is a first end of the second wave receiving channel. Typically, an end wall is provided at a second end of the second wave receiving channel opposite the first end. Typically, the first and third side walls extend from the end wall.

Thus, there may be a plurality of, or three or more, adjacent channels. Adjacent channels may have a common wall which functions as a side wall of two adjacent channels. The plurality of channels may have the same shape. The plurality of channels may have the same breadth. The plurality of channels may have sloping bases which correspond, for example which extend upwards at the same angle. The plurality of channels may have end walls which correspond, for example, which slope upwards at the same angle. There may be both one or more fore channels and one or more aft channels. The features described herein in relation to the channel may apply to some or all of the plurality of adjacent channels. The features described herein in relation to the channel may apply to the fore and/or after channel(s).

The floating body may comprise a sloping portion which extends beyond the (first end of) the channel(s) from the sloping base of the channel(s).

The floating body may extend laterally of the side walls of the channel(s). The floating body may comprise a sloping portion which forms the sloping base of the channel between side walls and which extends laterally of the side walls.

It may be that the second wave receiving channel has a second channel resonant frequency at least partly defined by the second sloping base and/or the first and third side walls (and/or the end wall, where provided), and wherein the said second wave receiving channel is configured to cause resonance (typically within the second channel) of waves received by the second channel and having the said second channel resonant frequency.

Typically, the second sloping base is configured to drive (e.g. electrical or hydraulic) power generation or storage apparatus responsive to received waves (typically to thereby generate or store (typically electrical or hydraulic) power), typically received through the wave receiving opening of the second wave receiving channel.

It may be that the said floating body is provided with an anti-corrosion coating, or wherein the said floating body has an external surface comprising or consisting of a corrosion resistant material.

It may be that the floating body typically has a chassis formed of a material (e.g. metal, fiberglass, concrete or a plastics material) and the anti-corrosion coating is a polymer formed on the external surface of the chassis. It may be that the floating body typically has a metal chassis and the anti-corrosion coating is a corrosion-resistant treated surface layer of the metal chassis.

It may be that the wave energy extractor has an anti-fouling coating (e.g. paint) on the external surface to restrict the growth of organisms.

It may be that the wave energy extractor is tethered to an object (e.g. the sea floor, or a wall etc.)

It may be that the wave energy extractor has (only) a single floating body.

It may be that the apparatus is a WEC which comprises the said (first) floating body and a further (second) floating body to which it is connected by a joint and the WEC generates energy (e.g. generates electricity, pumps water, or otherwise transforms energy into a human usable form) from the relative movement of the first and second floating bodies. There may be a power take-off, such as a generator, or (hydraulic or water) pump configured to generate electricity or pump fluid from the relative movement of the first and second floating bodies. However, it may be that the WEC is not configured to generate energy from the relative movement of the floating body and a further floating body.

Typically, the second floating body is a said floating body. The features described above in respect of the floating body typically also apply to the second floating body. Thus, the second floating body typically has a wave receiving channel having a sloping base and a wave receiving opening, both the sloping base and the wave receiving opening being provided between opposing first and second side walls, wherein at least part of the sloping base extends between a still water surface in a still water rest position. Features of the channel, the end wall, the possibility of there being two or more channels, etc. as described above may also apply to the second floating body.

The joint may be a hinged joint or, in some embodiments, a sliding joint. The WEC may be a hinged raft WEC.

Typically, the first floating body is a fore floating body and the second floating body is an aft floating body. This is determined by how they are moored, for example, there may be a tether connected to the first floating body, so that first floating body is fore.

The first and second floating bodies may be the same. The first and second floating bodies may comprise channels which are the same. However, typically, the first and second floating bodies are different. It may be that the distance from the wave receiving channel of the first floating body to the hinge is greater than the distance from the second wave receiving channel of the second floating body to the hinge, for example by at least 50% or at least 100%. It may be that the length of the first floating body is at least 50% or at least 100% greater than the length of the second floating body.

It may be that the sloping base of the second floating body extends upwards at a greater angle relating to the horizontal, when the wave energy extractor is at rest, than the sloping base of the first floating body, for example by at least 10° or at least 20° or at least 30°.

It may be that the second (aft) floating body has an aft end which (instead of a said channel) terminates with a sloping wall (e.g. sloping downwards in an aft direction at an angle of 60° to 90° or 60° to 80°).

It may be that the said floating body is not connected to another floating body by a joint.

The floating body may have a buoyancy such that at least some (e.g. at least 10%) of the mass of the floating body is above the water line in a still water rest position. The floating body may have a buoyancy such that at least 50% of the mass of the floating body is below the water line in a still water rest position.

It may be that the sloping base and the first and second side walls have longitudinal axes which extend in a first direction, wherein the said floating body has a further wave receiving channel comprising a further sloping base and further wave receiving opening, both the further sloping base and the further wave receiving opening being provided between a further pair of opposing side walls, at least a portion of the said further sloping base extending (typically from above the still water surface to) beneath the still water surface in the still water rest position, wherein the further sloping base and the further pair of side walls have longitudinal axes which extend in a second direction different from the first direction.

It may be that the said further channel has a further channel resonant frequency at least partly defined by the further sloping base and/or the said further pair of walls, and wherein the said further channel is configured to cause resonance (typically within the said further channel) of waves received by the said further channel through a wave receiving opening thereof and having the said further channel resonant frequency.

Typically, the further sloping base is configured to drive (e.g. electrical or hydraulic) power generation or storage apparatus responsive to received waves (typically to thereby generate or store (typically electrical or hydraulic) power). Typically, the received waves are received through the wave receiving opening of the further wave receiving channel. Typically, the wave receiving opening is provided between the said further pair of side walls. Typically, at least a portion of the wave receiving opening is provided at an end of the further wave receiving channel. Typically, the said end of the further wave receiving channel at which the said at least a portion of the wave receiving opening is provided is a first end of the further wave receiving channel. Typically, an end wall is provided at a second end of the further wave receiving channel opposite the first end. Typically, the further pair of side walls extend from the end wall.

It may be that the wave energy extractor has a said channel (or one or more said channels) at opposite ends (fore and aft) and oriented in opposite directions.

It may be that the wave energy extractor further comprises a yet further channel for receiving waves, the said yet further channel comprising a yet further sloping base and a yet further wave receiving opening, both the yet further sloping base and the yet further wave receiving opening being provided between a yet further side wall and one of the side walls of the said further pair of side walls extending in the said second direction, the said yet further side wall opposing the said one of the side walls of the said further pair of side walls. Typically, at least a portion of the yet further sloping base extends (typically from above the still water surface to) beneath the still water surface in the still water rest position.

Typically, the further sloping base and the yet further sloping base are integrally formed with each other.

It may be that the yet further channel has a yet further channel resonant frequency at least partly defined by the yet further sloping base and/or the yet further wall (and/or the end wall, where provided) and the said one of the walls of the said further pair of walls, and the said yet further channel is configured to cause resonance (typically within the yet further channel) of waves received by the yet further channel through the yet further wave receiving opening and having the said yet further channel resonant frequency. Typically, at least a portion of the yet further wave receiving opening is provided at an end of the said yet further wave receiving channel.

Typically, at least a portion of the yet further wave receiving opening is provided at a first end of the said yet further wave receiving channel and the end wall of the yet further wave receiving channel is provided at a second end of the yet further water receiving channel opposite the first end.

It may be that the floating body is tethered to an anchor.

It may be that the sloping base (or each said sloping base) comprises an end which is submerged beneath the still water surface in the still water rest position. It may be that the said (or said each) end is part has a lip, which may for example have a prismatic cross-section, for example, may be a cylinder (or respective cylinder) having a longitudinal axis extending perpendicularly or substantially perpendicularly to the said direction in which the (respective) sloping base extends and perpendicularly or substantially perpendicularly to the vertical. The lip may be buoyant. The lip may comprise a hydrodynamic fairing.

It may be that the wave energy extractor is a wave energy dissipater. It may be that the wave energy dissipater is configured to dissipate wave energy by causing wave breaking of incident waves. It may be that the wave energy dissipater has a significant damping effect on the wave field around the wave energy extractor (e.g. when in use).

The invention extends in a second aspect to a floating breakwater comprising the wave energy extractor of the first aspect of the invention, wherein the said wave energy extractor is a wave energy dissipater.

It may be that the floating breakwater comprises a plurality of the said wave energy dissipaters. It may be that adjacent ones of a plurality of the said wave energy dissipaters are spaced from each other. The plurality of said wave energy dissipaters may be fixedly joined to each other. It may be that dividing walls are provided between respective adjacent pairs of wave energy dissipaters of the said plurality of wave energy dissipaters.

It may be that the plurality of said wave energy dissipaters are coupled through flexible joints, which flexible joints may comprise energy dissipaters, such as brakes, to dissipate energy arising from relative movement (e.g. rocking) of adjacent wave energy dissipaters.

The wave energy dissipater(s) may comprise drag-increasing means (formations), for example, drag plates, vanes or orifices, which dissipate energy hydrodynamically.

According to a third aspect of the invention there is provided a method of dissipating wave energy, the method comprising:

providing a floating body having a wave receiving channel, the wave receiving channel having a sloping base and a wave receiving opening, both the sloping base and wave receiving opening being provided between opposing first and second side walls, wherein at least part of the sloping base extends beneath a still water surface in a still water rest position; and the channel receiving waves through the wave receiving opening, causing resonance of the received waves (typically within the said channel), the floating body being adapted to dissipate at least some of the energy thereby received.

The resonance effects pull wave energy from adjacent regions into the wave channel (this has the effect that the floating body has an incident wave cross-section greater than its physical cross-section perpendicular to the direction of wave travel). It also increases the wave height at the channel. Furthermore, the resonance effect increases the forces on the floating body typically thereby increasing movement of the floating body.

As a result, wave energy is dissipated due for example to the increased height of waves in the channel causing the waves to break (e.g. due to the steepness of the channel and/or slamming on the floating body). Wave flow moving around the floating body can also create turbulence which dissipates energy. Resonance effects can increase flow velocities, further dissipating more energy. Wave energy can also be dissipated by the increased movement of the floating body due to the increased forces acting on it. Movement of the floating body causes fluid turbulence, which dissipates energy.

According to a fourth aspect of the invention there is provided a method of extracting wave energy (from waves in a body of water, such as the ocean), the method comprising:

providing a floating body having a wave receiving channel, the wave receiving channel having a sloping base and a wave receiving opening, both the sloping base and wave receiving opening being provided between opposing first and second side walls, wherein at least part of the sloping base extends (typically from above a still water surface to) beneath a still water surface in a still water rest position; and the channel receiving waves through the wave receiving opening, causing resonance of the received waves (typically within the said channel) to thereby extract wave energy.

The method may be a method of converting wave energy (to another form). The wave energy may for example be used to drive (e.g. electrical or hydraulic) power generation or storage apparatus. Electrical or hydraulic power is thereby generated or stored.

Wave energy may be converted to useful work, for example, to pump liquid (e.g. in a water pump or desalinator). The method may be a method of dissipating wave energy.

The method may comprise the initial step of measuring properties of the waves at a location, averaged over a period of time, and selecting the floating body from amongst a plurality of possible floating bodies having different configuration (e.g. different distances between the first and second side walls) taking into account the measured properties.

The measured properties typically comprise the distribution (e.g. average (mean, mode or median) period between waves), the power spectral density and so forth. Typically, where the waves at the location have a relatively high mean wavelength (relatively high mean period), a floating body with a relatively large distance between the first and second side walls will be selected.

The method may comprise measuring properties of the waves at a first location and a second location, the second location having a wavelength corresponding to the mean period between waves, at a greater wavelength than at the first location, and installing a wave energy extractor comprising a said floating body at each of the first location and the second location, wherein the distance between the opposing first and second side walls of the channel of the floating body installed at the first location is greater than the distance between the opposing first and second side walls of the channel of the floating body installed at the second location.

By the wavelength corresponding to the mean period between waves, we refer to the wavelength of a wave having a period which is the same as the mean measured period between waves.

The method may comprise fitting a wave channel attachment, which comprises the said wave receiving channel, side walls and sloping base, to a floating body or a buoyant hull.

The method may comprise the initial step of measuring properties of the waves at a location, averaged over a period of time, and selecting the wave channel from amongst a plurality of possible wave channels having different configurations (e.g. distances between the first and second side) walls taking into account the measured properties.

The measured properties typically comprise the distribution (e.g. average (mean, mode or median) period between waves), the power spectral density and so forth. Typically, where the waves at the location have a relatively high mean wavelength (relatively high mean period), a floating body with a relatively large distance between the first and second side walls will be selected.

According to a fifth aspect of the invention there is provided apparatus comprising a buoyant hull tethered to an anchor, the buoyant hull having a wave receiving channel comprising a sloping base and a wave receiving opening, at least part of the sloping base extending beneath a still water surface in a still water rest position, the wave receiving channel being configured such that incoming waves received by the channel through the wave receiving opening cause the body to move relative to the anchor to thereby extract (typically convert) wave energy.

The wave energy, may, for example, be used to drive a (e.g. electrical or hydraulic) power generation or (e.g. electrical or hydraulic) power storage apparatus (typically to thereby generate or store (typically electrical or hydraulic) power).

It may be that the anchor is suspended in a body of water under the buoyant hull. The anchor may comprise the floor of a body of water containing the buoyant hull. It may be that the anchor is a structure which is adjacent the buoyant hull.

The anchor may for example be a wall, or other structure. The anchor might be buoyant.

The buoyant hull may move, relative to the anchor, horizontally (surge), vertically (heave) or rotationally (pitch).

It may be that the apparatus is a heaving buoy WEC.

It may be that the wave receiving channel has a resonant frequency such that waves received by the wave receiving channel through the wave receiving opening and having the said resonant frequency resonate in the said wave receiving channel to thereby cause the buoy to move (e.g. heave) relative to the anchor to thereby drive the said energy extraction (typically, energy conversion, e.g. power generation or power storage).

It may be that the sloping base and the wave receiving opening of the wave receiving channel are provided between first and second side walls.

It may be that the said resonant frequency of the wave receiving channel is at least partly defined by the sloping surface and/or the first and second side walls.

It may be that the buoyant hull further comprises a second wave receiving channel comprising a second sloping base (and typically a third side wall and the first side wall which oppose each other) and a second wave receiving opening for receiving incoming waves.

The second wave receiving channel may be parallel to the first wave receiving channel, and slope downwards and the same direction.

It may be that the second wave receiving channel has a second channel resonant frequency at least partly defined by the second sloping base (and/or by the first and third walls where provided), and wherein the said second wave receiving channel is configured to cause resonance (typically within the second channel) of incoming waves received by the second wave receiving channel through the second wave receiving opening and having the said second channel resonant frequency.

The apparatus may comprise a single said buoyant hull.

It may be that the said buoyant hull is not connected to another buoyant hull by a joint (such as a hinge joint, sliding joint etc).

It may be that the sloping base (and typically the first and second side walls where provided) has a longitudinal axis which extends in a first direction, wherein the said floating buoy has a further wave receiving channel comprising a further sloping base (typically provided between a further pair of opposing side walls) and a further wave receiving opening, at least a portion of the said further sloping base extending (typically from above the still water surface to) beneath the still water surface in the still water rest position, wherein the further sloping base (and typically the further pair of side walls) has a longitudinal axis which extends in a second direction different from (e.g. opposite to) the first direction.

Thus, the wave receiving channel and further wave receiving channel may be located on opposite sides of the buoyant hull (fore and aft relative to incident waves) and extend in opposite directions.

It may be that the said further channel has a further channel resonant frequency at least partly defined by the further sloping base (and/or by the said further pair of walls), and wherein the said further channel is configured to cause resonance (typically within the said further channel) of waves received by the said further channel through the further wave receiving opening and having the said further channel resonant frequency.

It may be that the buoyant hull further comprises a yet further channel for receiving waves, the said yet further channel comprising a yet further sloping base (typically provided between a yet further side wall and one of the side walls of the said further pair of side walls) extending in the said second direction and a yet further wave receiving opening for receiving incoming waves (and typically provided between the said yet further side wall and the said one of the side walls of the said further pair of side walls). Typically, at least a portion of the yet further sloping base extends (typically from above the still water surface to) beneath the still water surface in the still water rest position. Typically, the further sloping base and the yet further sloping base are integrally formed with each other.

It may be that the yet further channel has a yet further channel resonant frequency at least partly defined by the yet further sloping base (and/or by the yet further wall and the said one of the walls of the said further pair of walls), and the said yet further channel is configured to cause resonance (typically within the yet further channel) of waves received by the yet further channel through the yet further wave receiving opening and having the said yet further channel resonant frequency. Typically, at least a portion of the wave receiving opening is provided at an end of the said yet further wave receiving channel.

It may be that the buoyant hull is tethered to the anchor by an elastic tether. It may be that the buoyant hull is tethered to the anchor by a variable length tether.

The buoyant hull may be tethered to the anchor by a joint, such as a hinged or sliding joint.

The floating buoy may comprise an anti-corrosion coating. It may be that the floating buoy has an external surface comprising or consisting of a corrosion resistant material.

According to a sixth aspect there is provided a method of generating or storing (e.g. electrical or hydraulic) power, the method comprising:

providing a buoyant hull tethered to an anchor provided (typically directly) beneath the buoyant hull, the buoyant hull having a wave receiving channel comprising a sloping base and a wave receiving opening, at least part of the sloping base extending (typically from above a still water surface to) beneath a still water surface in a still water rest position; and incoming waves being received by the wave receiving channel through the wave receiving opening, thereby causing the buoyant hull to move (e.g. heave) relative to the anchor to thereby extract wave energy from the waves to thereby generate or store power.

According to a seventh aspect of the invention there is provided a method of designing a wave energy extractor according to the first aspect of the invention, the method comprising generating a mathematical model of a wave energy extractor according to the first aspect of the invention, the model including a plate covering some or all of the top of the channel, and carrying out a numerical simulation of the response of the wave energy extractor including the plate in the presence of water waves (e.g. water waves which are typical of an intended location of wave energy extractor), wherein in the numerical simulation, the plate is treated as substantially massless but as applying damping forces to water. The invention extends in an eighth aspect to a wave energy extractor, not including the said (virtual) plate, designed by the method of the seventh aspect of the invention.

In some embodiments, the floating body may further comprise at least one (e.g. damping) plate. In some embodiments, or more wave receiving channels may comprise one or more (e.g. damping) plates. For example, the plates may be connected to the side walls and be substantially parallel to the base, however other arrangements are possible. Typically, the plates are arranged such that resonant wave modes are (optionally critically) damped. It may be that damping plates only exist in computer models of the floating body (e.g. they may be virtual damping plates which allow solutions to calculations relating to designs of a floating body to be solved more efficiently) and that the damping plates do not appear outside of numerical simulations and/or models.

The numerical simulation typically applies linear wave equations. Advantageously, the damping effect of the plates is found to make numerical simulations based on linear wave equations more closely resemble actual experimental results as they damp out non-linear resonances which arise from linear wave equations but which are attenuated in practice. In some embodiments, the (e.g. virtual) damping plate also causes reflection of waves within the wave channel and may optionally have a complex damping coefficient.

The plate is typically horizontal in the still water rest position.

Features described in relation to any aspect of the invention are optional features of each aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1A:
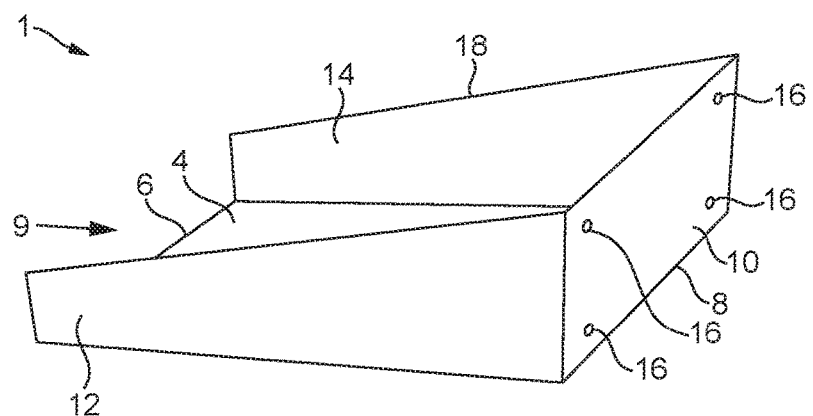
FIG. 1A is a perspective view of a channel.
Figure 1B:
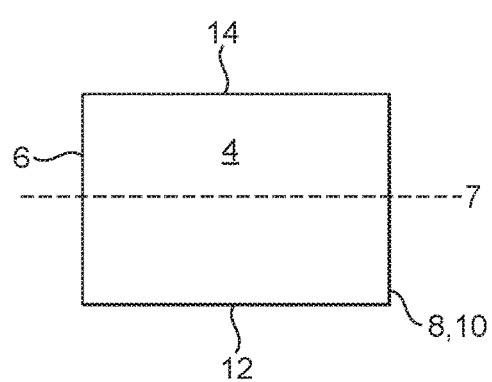
FIG. 1B is a plan view and 1C is a cross-section through the channel located in water.
Figure 1C:
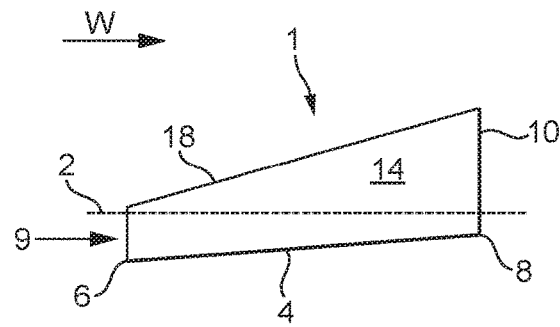

With reference to FIGS. 1A-1C, a channel 1 is provided as a component of a wave energy extraction device such as a wave energy converter (WEC) or dissipater. FIG. 1C shows the position of the channel relative to the still water surface 2 when a wave energy extraction device having the channel is at rest in still water (the still water rest position, referred to herein as a neutral position). In this description, directions and orientations such as horizontal and vertical refer to the directions when the channel is oriented in this neutral position. Label W indicates the direction of incident waves during normal operation.

The channel has a longitudinal axis 7, a sloping base 4 which extends from a first end 6 to a second end 8 from where an end wall 10 extends vertically. Side walls 12 and 14 are provided at opposite lateral sides of the sloping base. In this example, the side walls extend above the water line in the neutral position. Given the direction of incident waves, the first end 6 is at the fore end of the channel and the second end 8 is at the aft end. The area above the fore end functions as the opening 9 through which waves enter the channel.

Figure 2A:
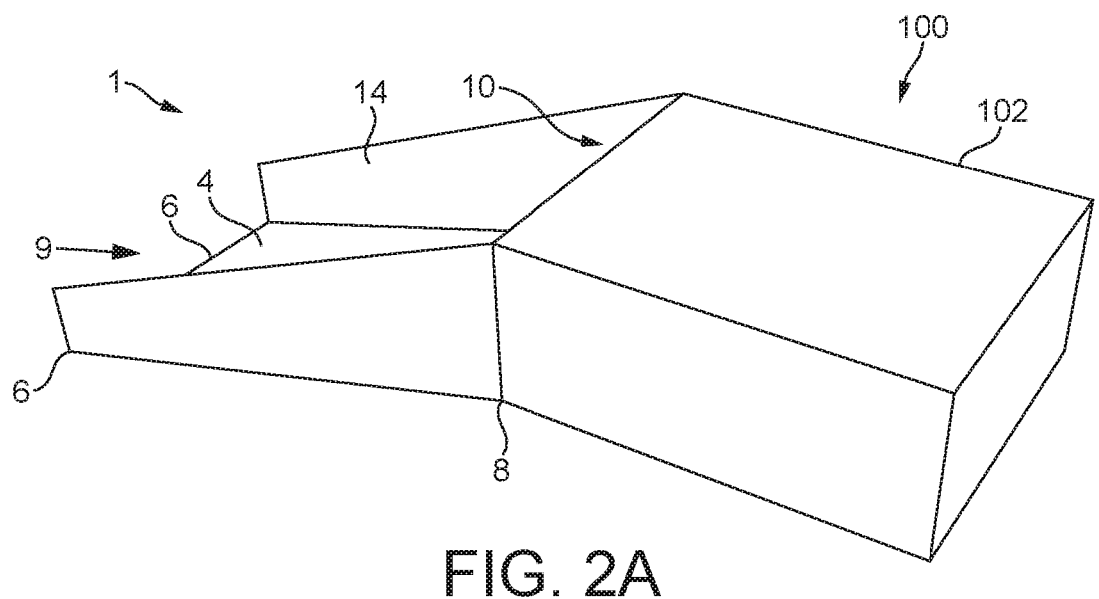
FIG. 2A is a perspective view of a buoyant hull having the channel of FIG. 1A.
Figure 2B:
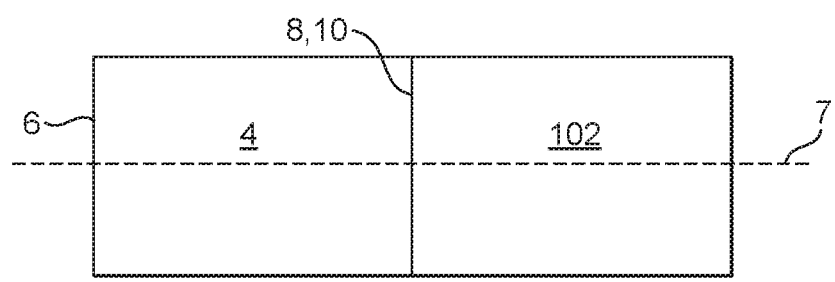
FIG. 2B is a plan view and 2C is a cross-section through the buoyant hull located in water.
Figure 2C:
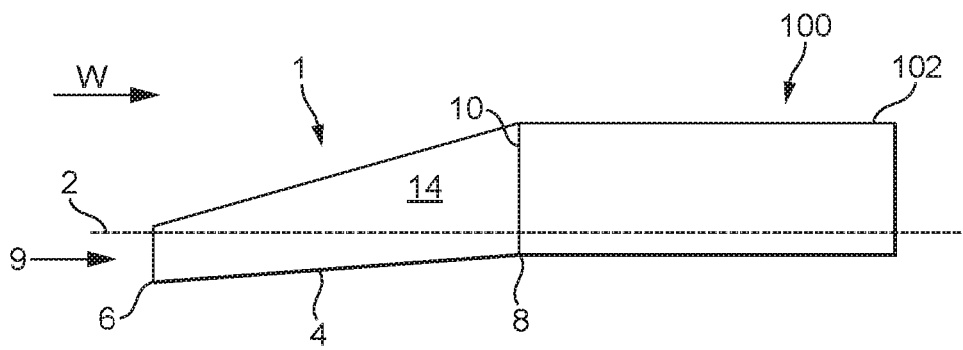

The channel may be provided as an individual component for attachment to, or integration into, a wave energy extractor and may have fixtures 16 (such as bolt holes) for such purpose. However, FIGS. 2A through 2C show the channel 1 provides at the fore of a buoyant hull 100 having a buoyant component 102 and being a component of a wave energy extractor. Although the buoyant hull may be made of a material, such as a plastic material or fibreglass, which has sufficiently low density to be buoyant, it typically comprises a relatively dense resilient material (e.g. steel) with one or more internal components filled with a low-density material, such as air, or vacuum.

We have found that, surprisingly, a channel such as that shown in FIGS. 1 and 2, is especially useful for wave energy extraction. Without wanting to be bound by theory we propose that the channel creates resonance effects leading to this enhanced wave energy extraction.

Figure 3:
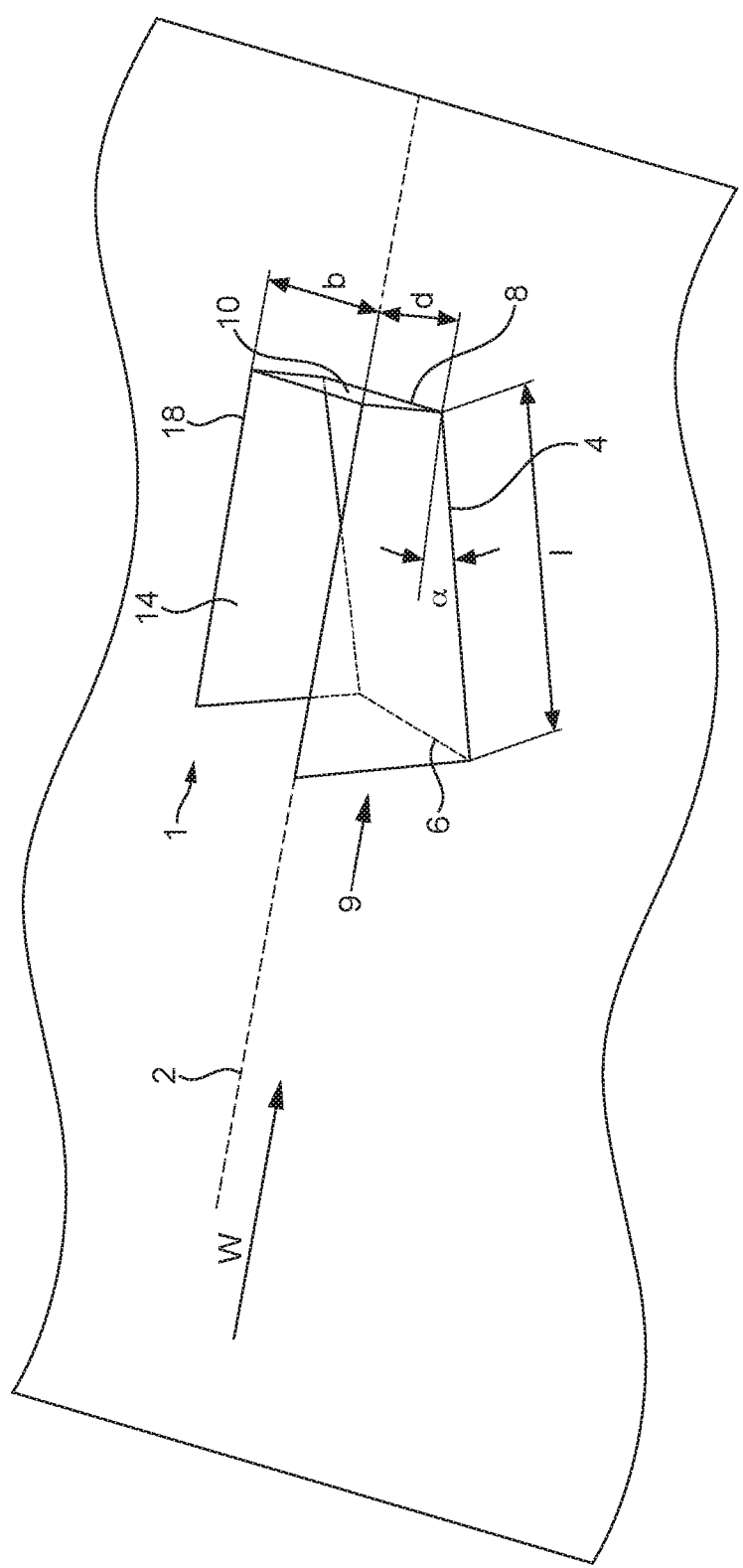
FIG. 3 illustrates key dimensions of a channel.

With reference to FIG. 3, characteristic dimensions of the basic channel 1 are the length, l, of the sloping base; the depth, d, of the second end of the channel, relative to the water surface in the neutral position; b, the beam (width) of the channel, between the side walls; and α, the angle at which the sloping base extends below the horizontal (in the neutral position). Practical embodiments may include additional characteristic dimensions, for example, the bases may have a variable slope, the side walls need not be parallel, the end wall need not be vertical.

Figure 4A:
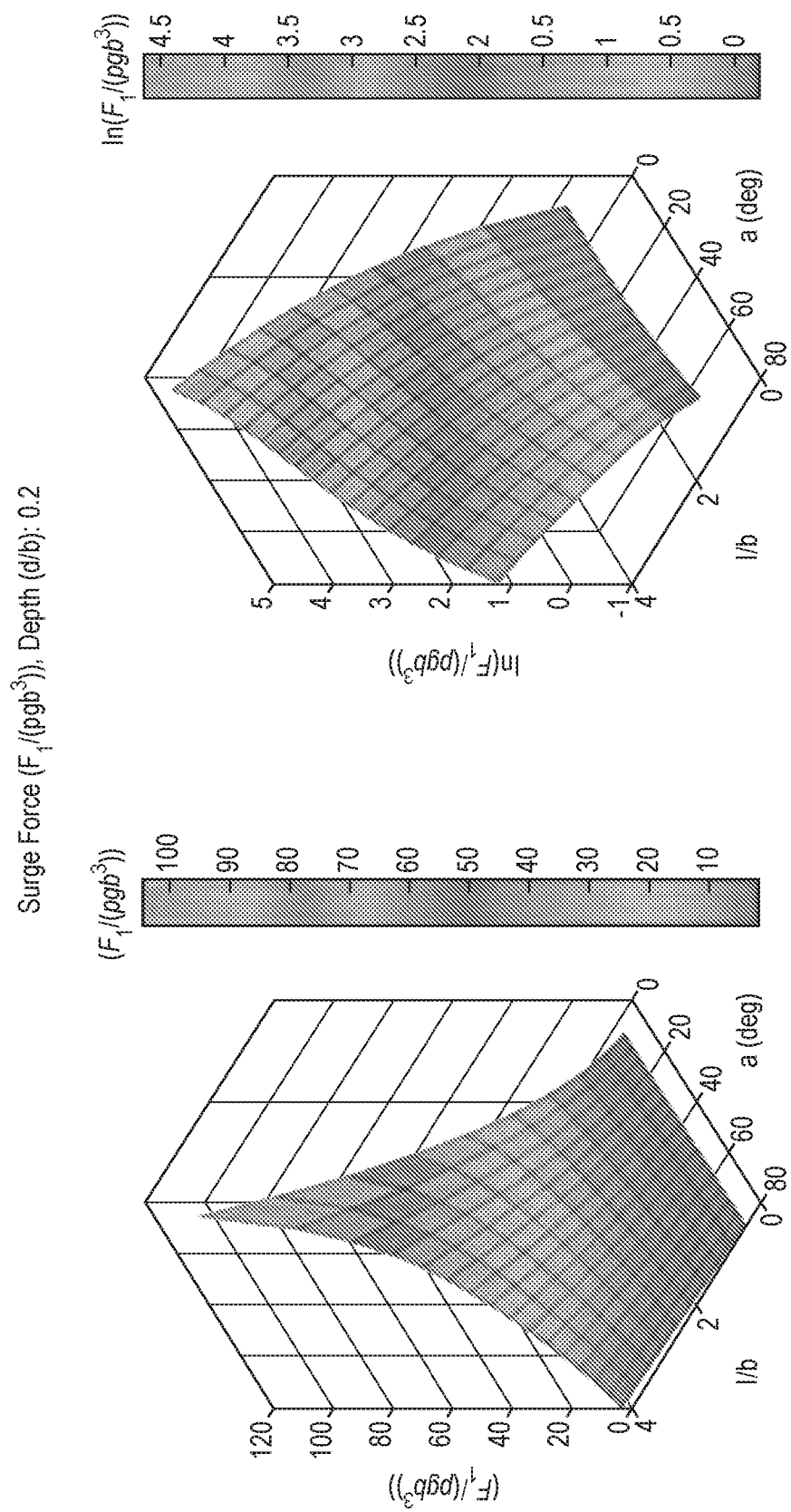
FIG. 4A is a graph of the simulated peak water elevation of incident waves within the channel, as a function of l, b, α and d.

FIG. 4A illustrates the peak wave elevation within the channel as a function of l, d, b and α as simulated using linear wave theory. In linear wave theory, the wavelength, λ, is a function of radial frequency, ω, and water depth, h, via the dispersion relation:

$$\omega^2 = \frac{2\pi g}{\lambda} \tan \frac{2\pi h}{\lambda}$$

for finite depth water, or $$\omega^2 = \frac{2\pi g}{\lambda}$$

when the water can be assumed to be of infinite depth. Here, g is the gravitational constant. Rather than ω, we here use λ. Dimensions are non-dimensionalised by the beam of the channel, i.e. l/b, d/b, λ/b.

The choice of dimensions of the channel are important as they effect the resonant modes of the WEC and, as a result, the energy which it may generate. Of particular importance are the angle of slope of the sloping base of the wave receiving channel, and the length-to-width ratio (i.e. the ratio of the length of the base to the width of the base (distance between side walls) of the wave receiving channel. For example, a longer and narrower base will excite a stronger resonance at a longer wavelength than will a shorter and wider base.

Figure 4B:
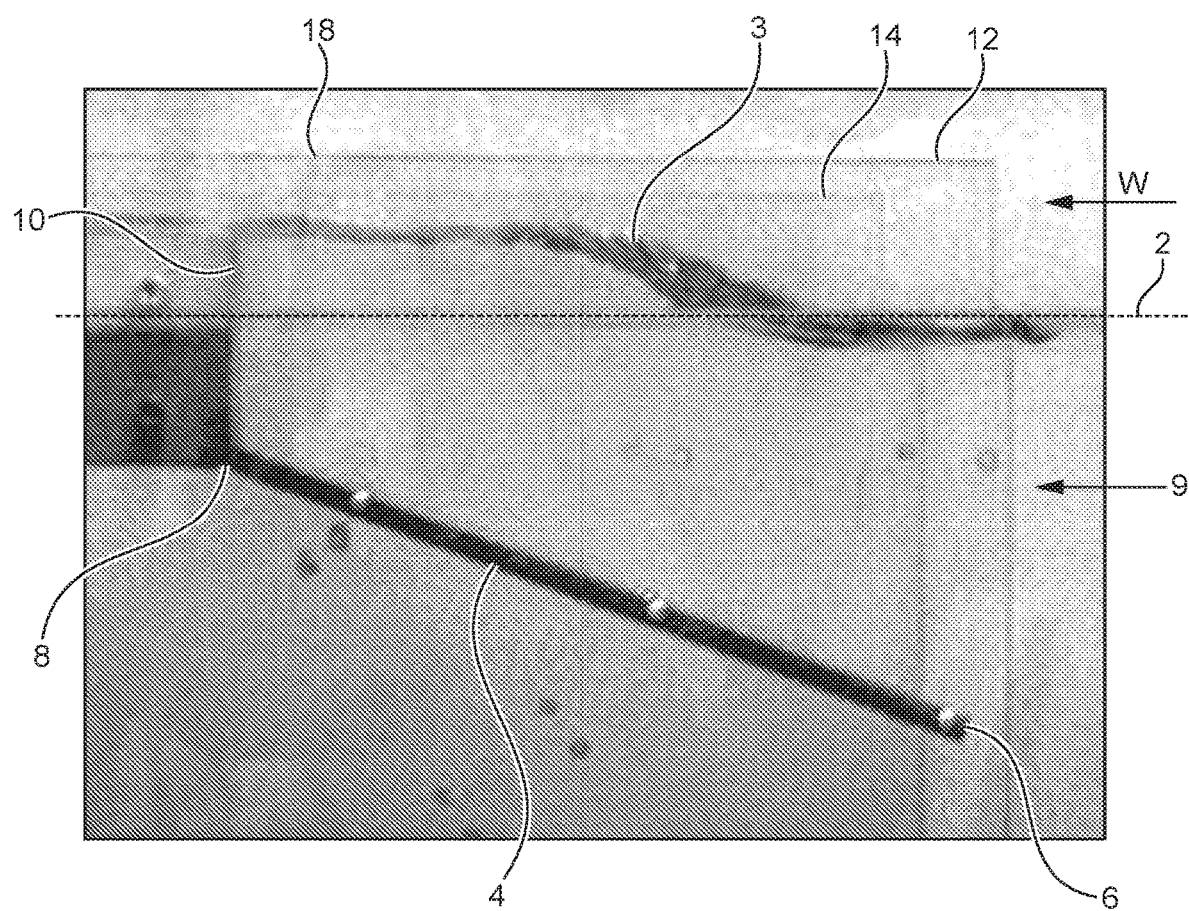
FIG. 4B is a photograph of peak water elevation of incident waves in an example embodiment.

FIG. 4B shows a practical implementation. Waves travel right to left in the picture into channel 1 which generally corresponds to the channel of FIG. 1 with corresponding labelled features. The height of the water surface 3 is substantially raised above the still water level 2 at the moment shown in the picture.

Figure 5:
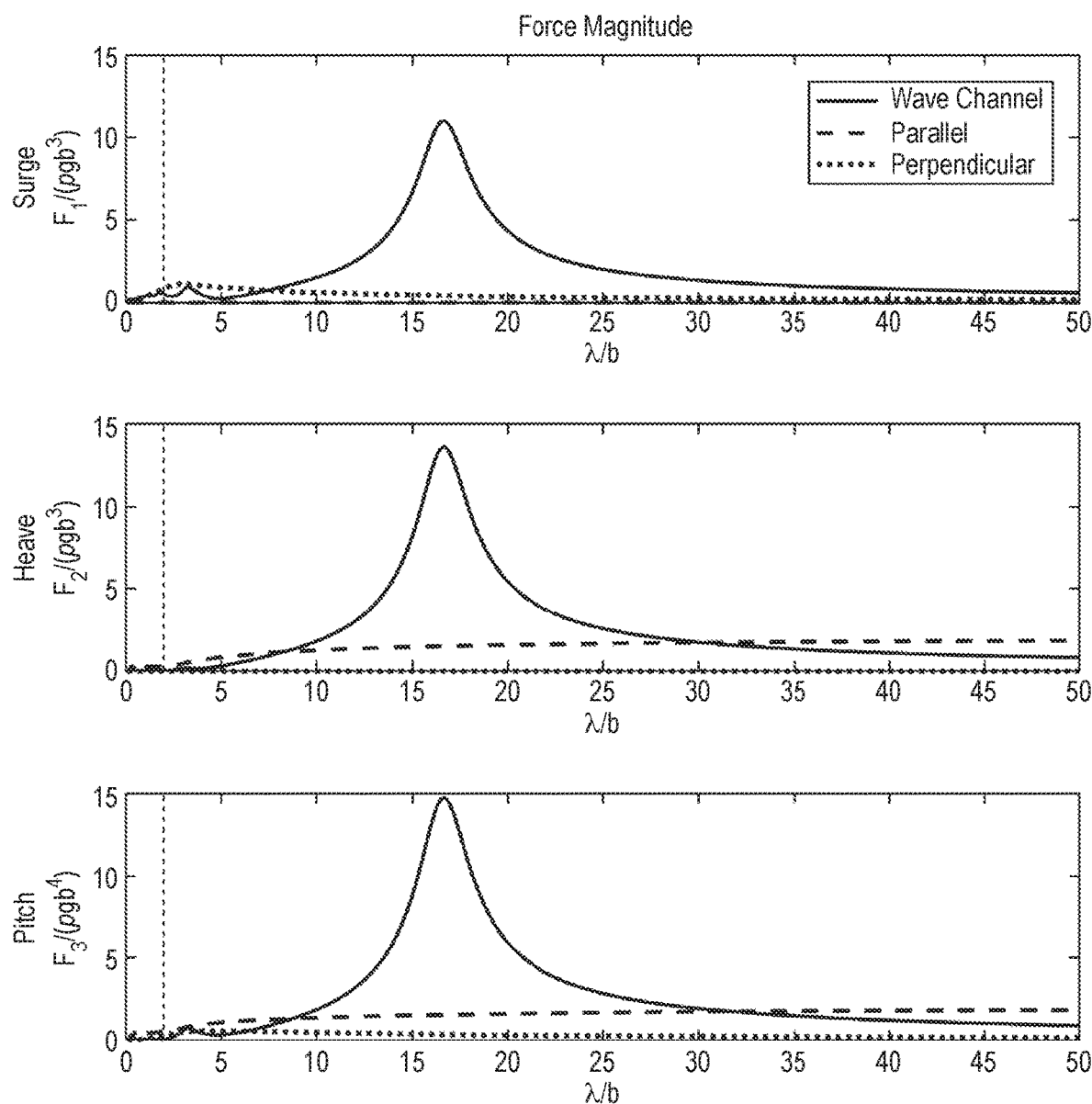
FIG. 5 is a graph of the variation with λ/b in surge, heave and pitches forces exerted on a channel such as that of FIG. 1, with α=20°, d/b=0.5 and l/b=2, compared to a channel with a non-sloping (horizontal in the neutral position) surface and a hull having a vertical fore end wall with no channel.

FIG. 5 shows the variation with λ/b in the surge, heave and pitch forces on a hinged floating raft WEC having a channel according to FIGS. 1 and 2. It can be seen that there is a resonance effect, with substantially increased applied forces, at λ/b of between about 15 and 20, compared to corresponding devices with a horizontal base or vertical end wall. These additional forces are indicative of a surprising amount of energy extraction from the waves and it is useful that the peak wavelength is substantially greater than the beam (and so in practical embodiments typically the length) of the wave energy extraction device, thereby enabling a relatively compact device to be provided to efficiently extract energy from the relatively long wavelengths components of typical ocean waves.

Figure 6A:
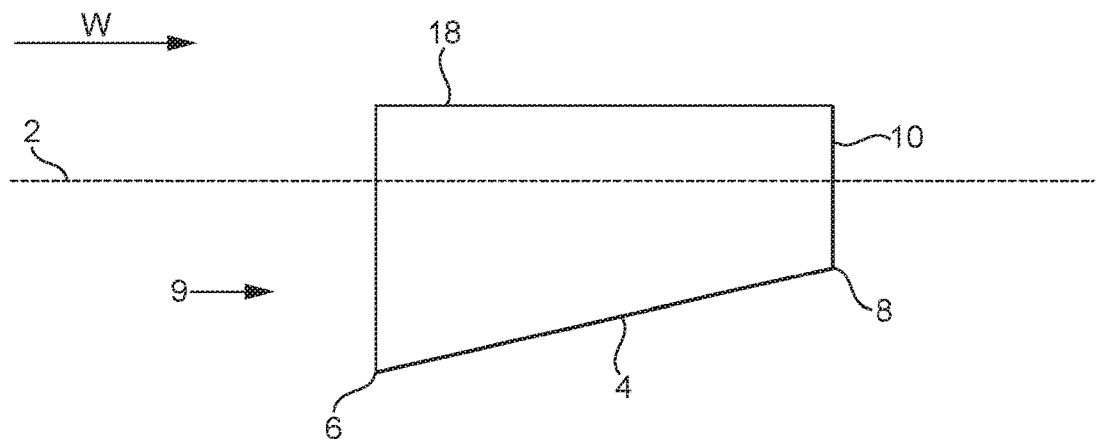
FIGS. 6A through 6F are cross-sections through alternative channels.
Figure 6B:
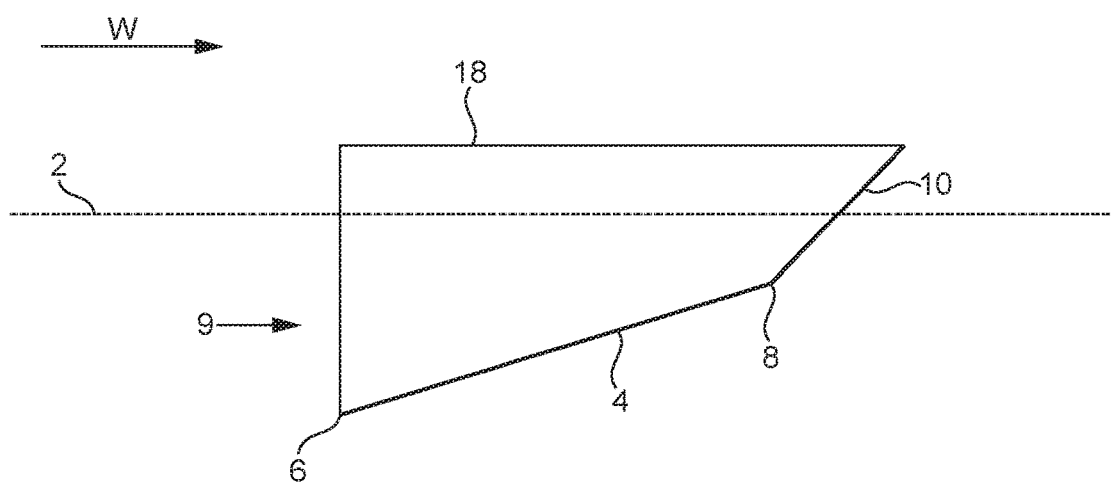
Figure 6C:
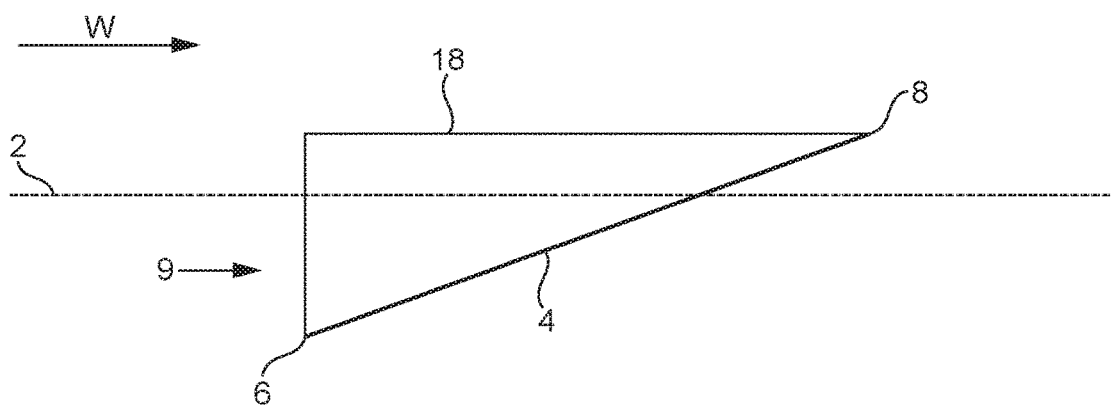
Figure 6D:
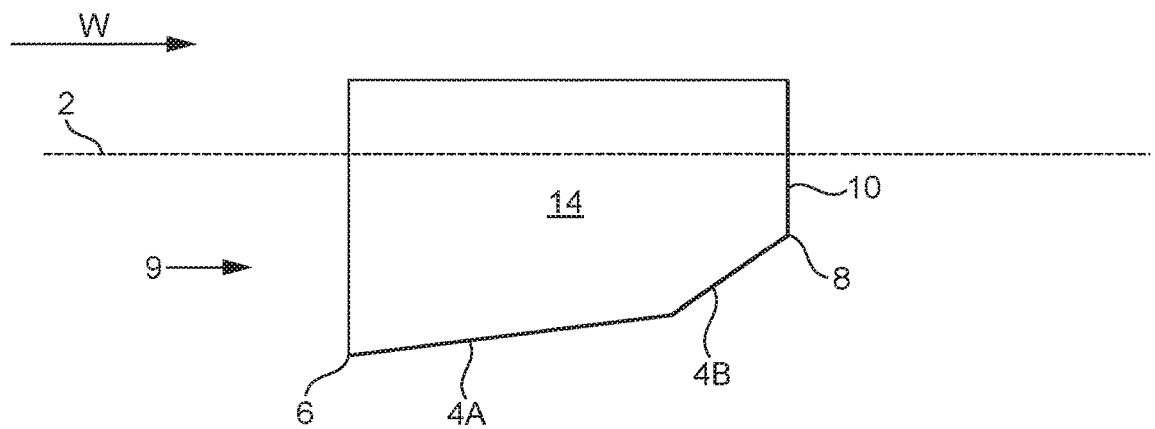
Figure 6E:
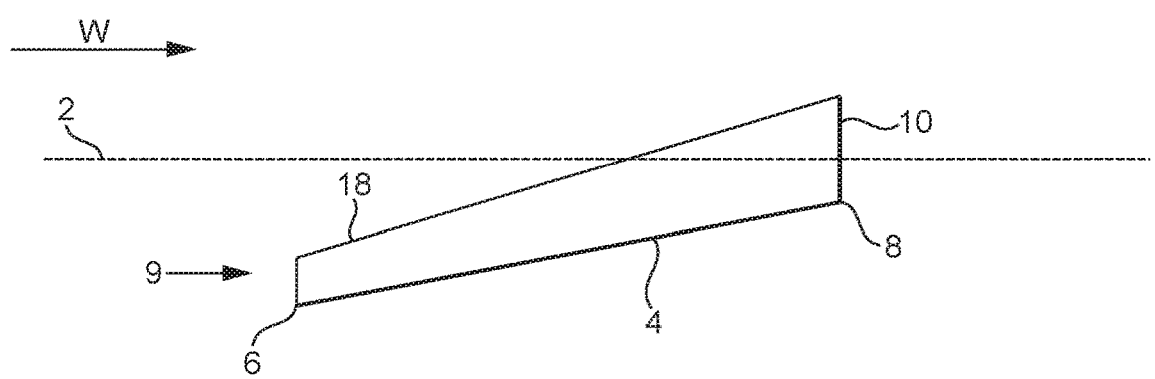
Figure 6F:
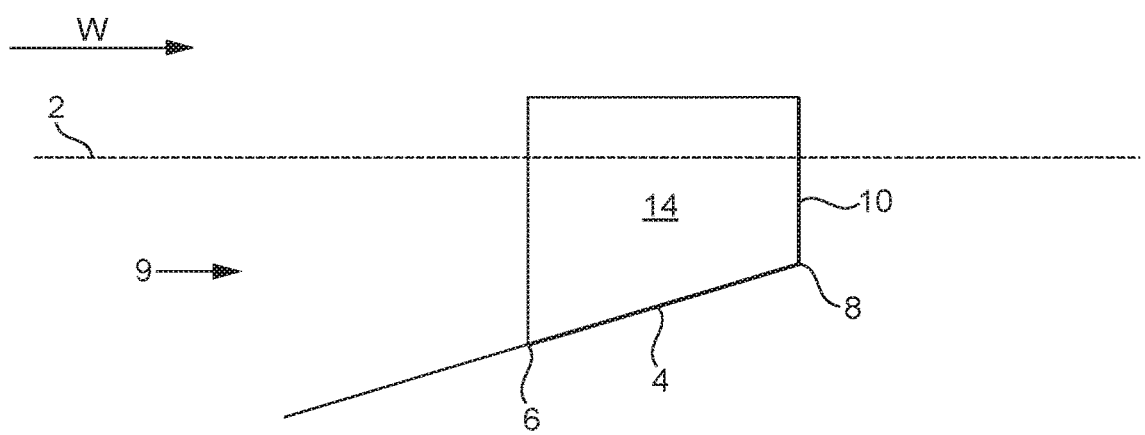

It is not required that the channel has the shape of FIG. 1 or 2. Some alternative cross sections are shown in FIGS. 6A through 6F. In 6A, the top edge 18 of the side walls are generally horizontal in the neutral position. In FIG. 6B, the end wall is not vertical but is sloped (in this example at 45° to the vertical). In FIG. 6C, there is no discrete end wall as such. In FIG. 6D, the sloping base has a first sloping section 4A and a second sloping section 4B which extends from the first sloping section, towards the second end of the sloping base, at a greater angle relative to the horizontal, than the first sloping section. Alternatively, second sloping section 4B can be seen a portion of the end wall 10. In FIG. 6E, the tops of the side walls are also sloped, extending at a different angle (in this example at a greater angle relative to the horizontal) to the sloping base. In FIG. 6F, the side walls do not extend the whole way to the first end of the sloping base and so the sloping base extends forewards of the channel.

Figure 7A:
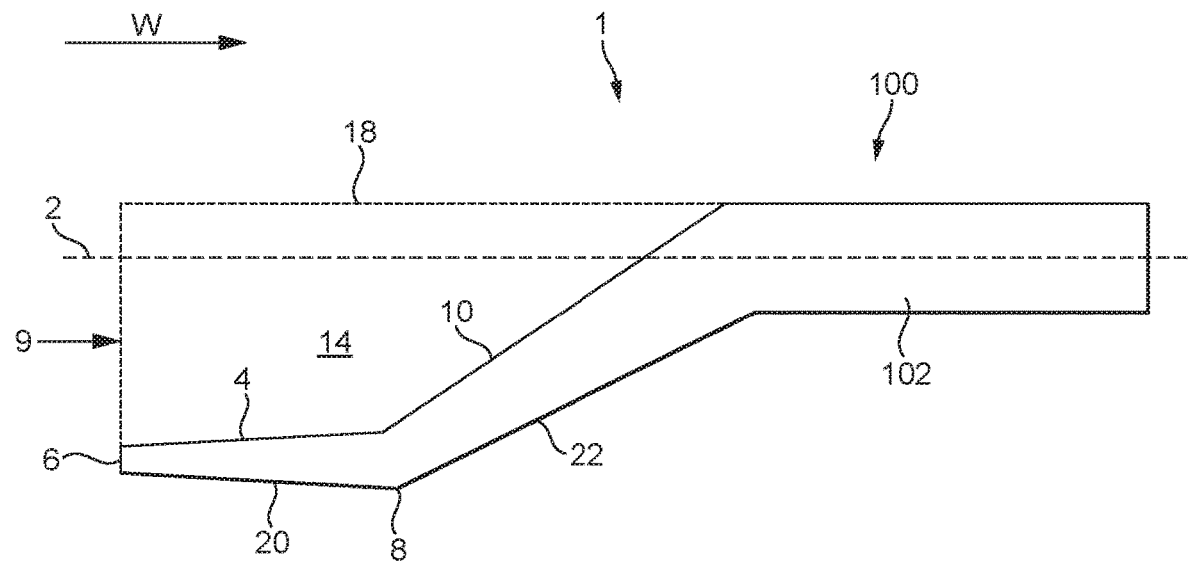
FIGS. 7A through 7E are cross-sections through further alternative channels.
Figure 7B:
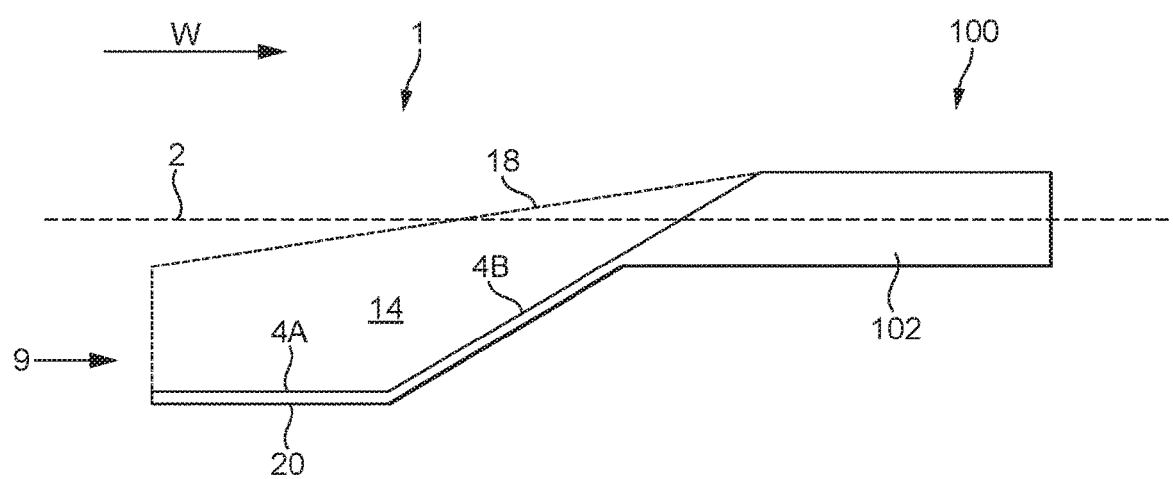
Figure 7C:
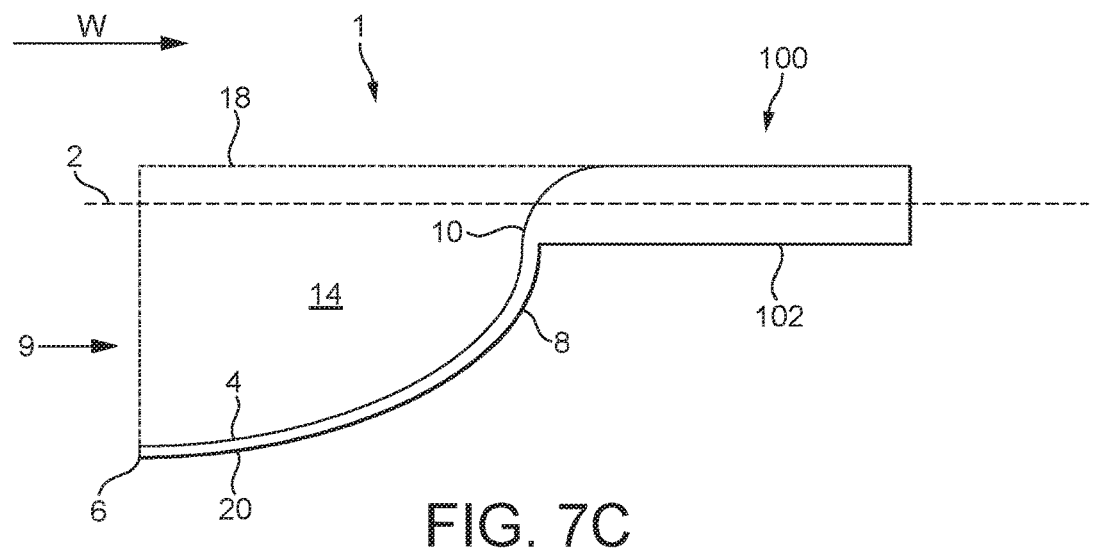
Figure 7D:
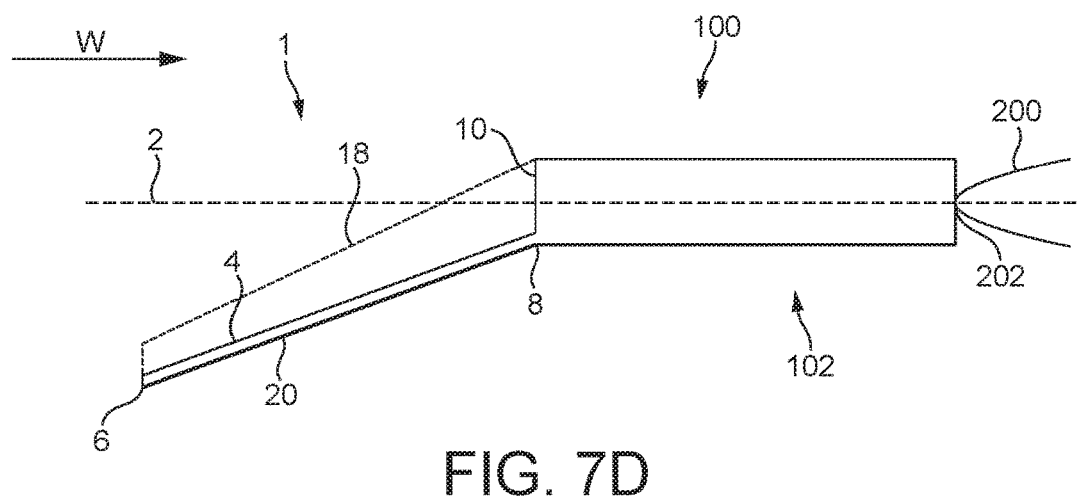
Figure 7E:
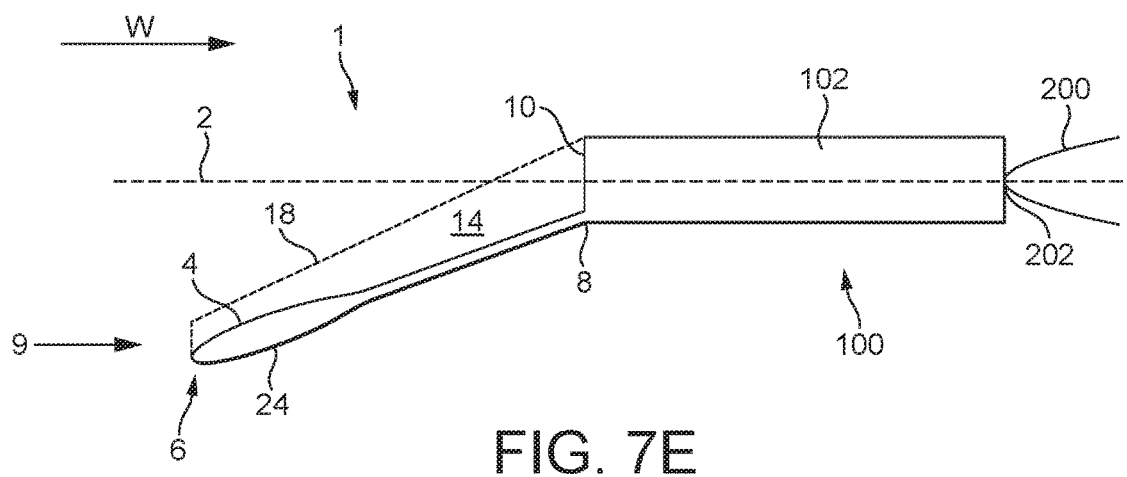

In FIGS. 1, 2 and 6A through 6F, the sloping base is formed by a plate, and the distance between the sloping base of the channel 4 and the underside 20 of the channel is constant. In FIG. 7A, the sloping base 4 has a different slope to the underside of the channel—indeed in this example the underside of the channel slopes downward towards the second end. The underside of the channel 22 below the end wall slopes at a different angle to the end wall. In FIG. 7B, the sloping base has a first region, 4A and a second region 4B, which is towards the second end and slopes at a greater angle relative to the horizontal than the first region and there is not a distinct end wall. In the embodiment of FIG. 7C, the sloping base curves (and is concave, with a slope which increases towards the second end), and blends into the end wall 10. In FIG. 7D, the upper edge 18 of the side walls and the sloping base slope at different angles relative to the horizontal in the still water position. The side walls are trapezoidal in this example (in some other examples they are rectangular, or scalene trapezoids, for example). The floating body is attached to a second floating body 200 by a hinged joint 202. The embodiment of FIG. 7E corresponds except that the first end of the channel has a lip 24 in the form of a hydrodynamic fairing.

Figure 8A:
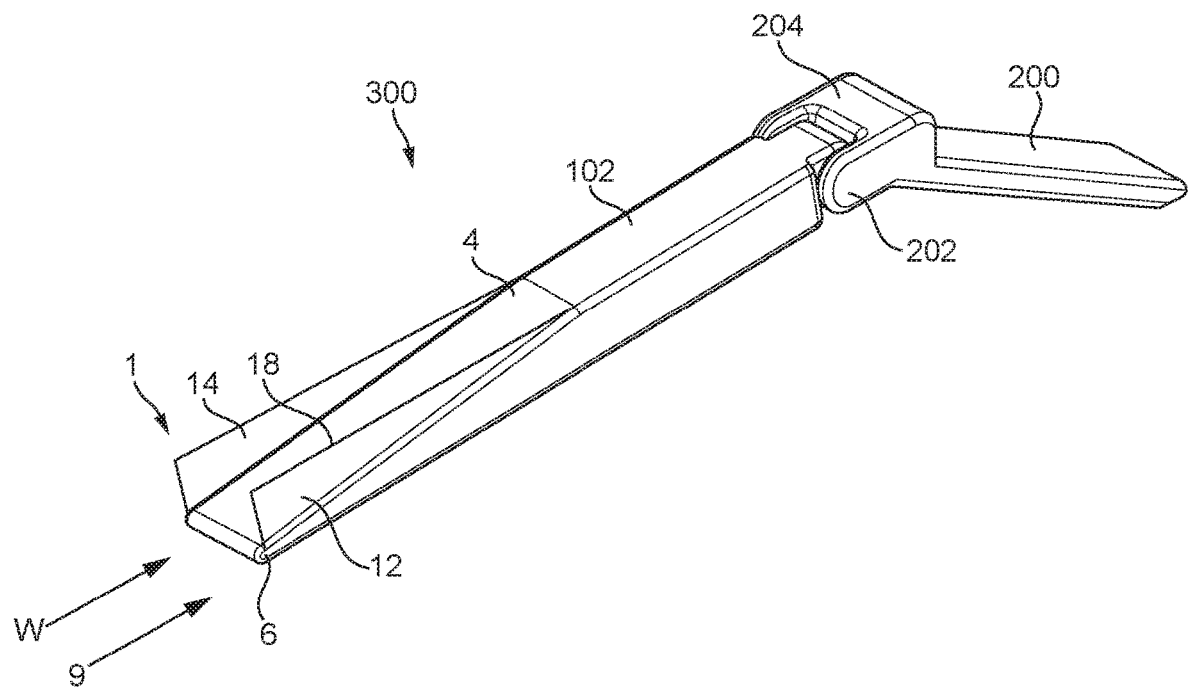
FIG. 8A is an example of a floating hinge wave energy converter (WEC) with a channel according to the invention and FIG. 8B is a cross-section therethrough.

FIG. 8A shows a floating hinge WEC 300 having a first floating body 102 having a channel 1 at a fore end thereof, and a second floating body 200, connected to the first floating body by a hinged joint 202. An electricity generator, or other energy conversion apparatus, such as a pump (e.g. a hydraulic pump or water pump) 204 may be located in the hinge region to convert received wave energy into another form (e.g. electricity, fluid power etc.)

Figure 8B:
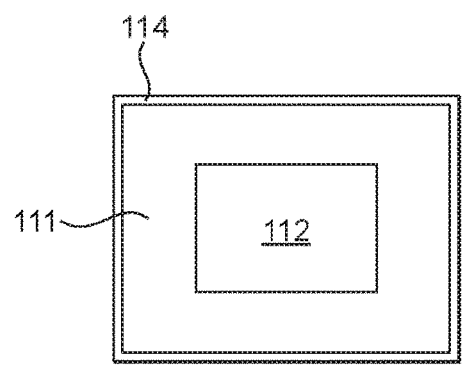

With reference to FIG. 8B, which is a cross-section through the first floating body, the floating body has a chassis 111, formed for example from metal, fiberglass, concrete or a plastics material, and in some embodiments including a buoyant core 112 (e.g. a sealed compartment containing air, or another gas, or a vacuum, or a low-density plastics material, and optionally one or more ballast chambers) has an antic-corrosion coating 114 formed on the external surface of the chassis. The surface is also treated with an anti-fouling coating (e.g. paint) on the external surface to restrict the growth of organisms.

Figure 9:
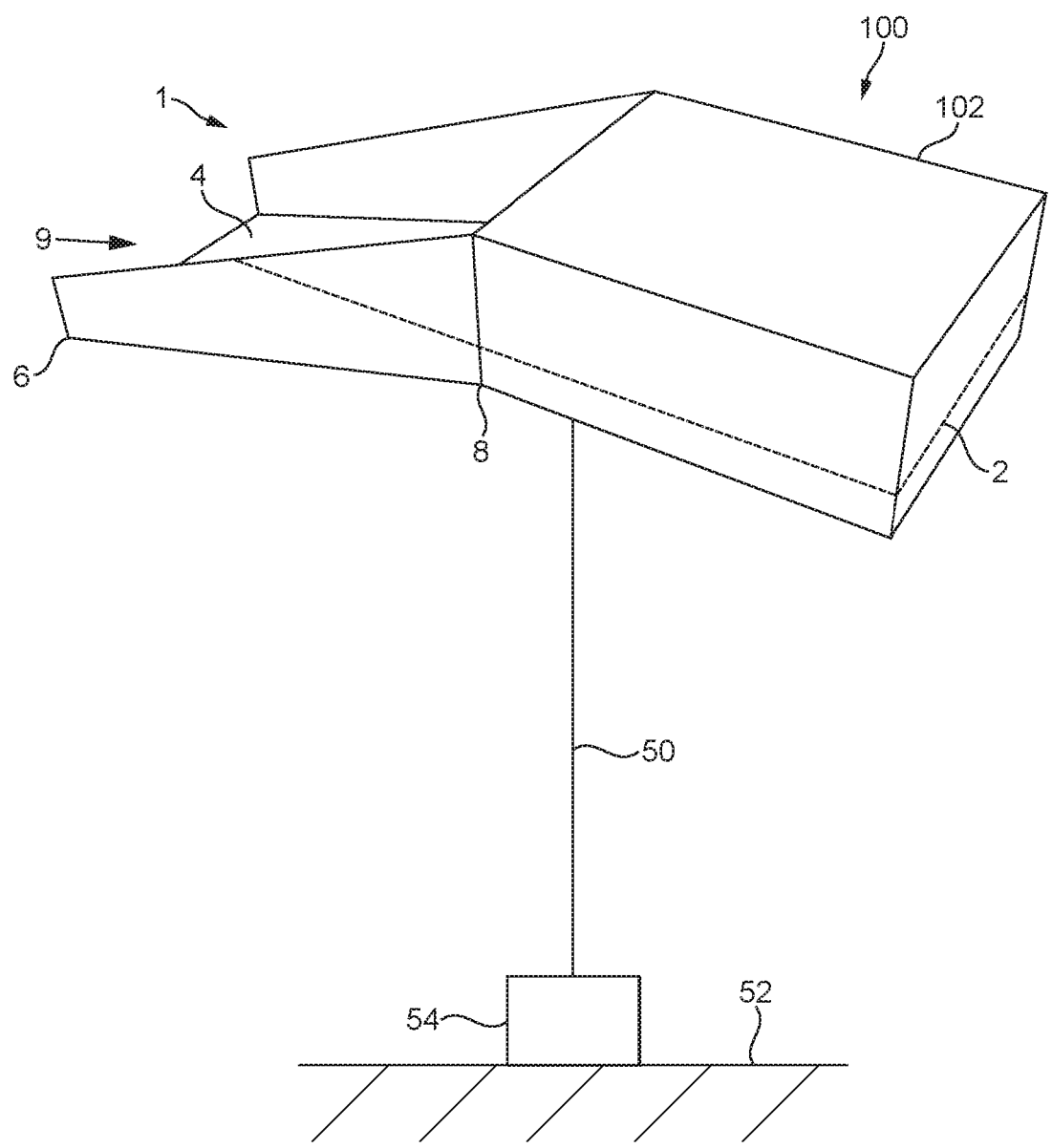
FIG. 9 is a schematic diagram of a heaving buoy WEC.

However, the invention is also useful with for example a heaving buoy WEC, such as that shown in FIG. 9 in which a floating body 100 comprises buoyant hull 102 with a channel 1 as described in FIG. 2 at a fore end thereof. The floating hull is tethered through a connector 50 to an anchor (in this case, the sea bed 52) through an electricity generator 54 (or pump) which generated electricity (or pressurised hydraulic fluid or water) from the heaving motion of the floating body.

Figure 10:
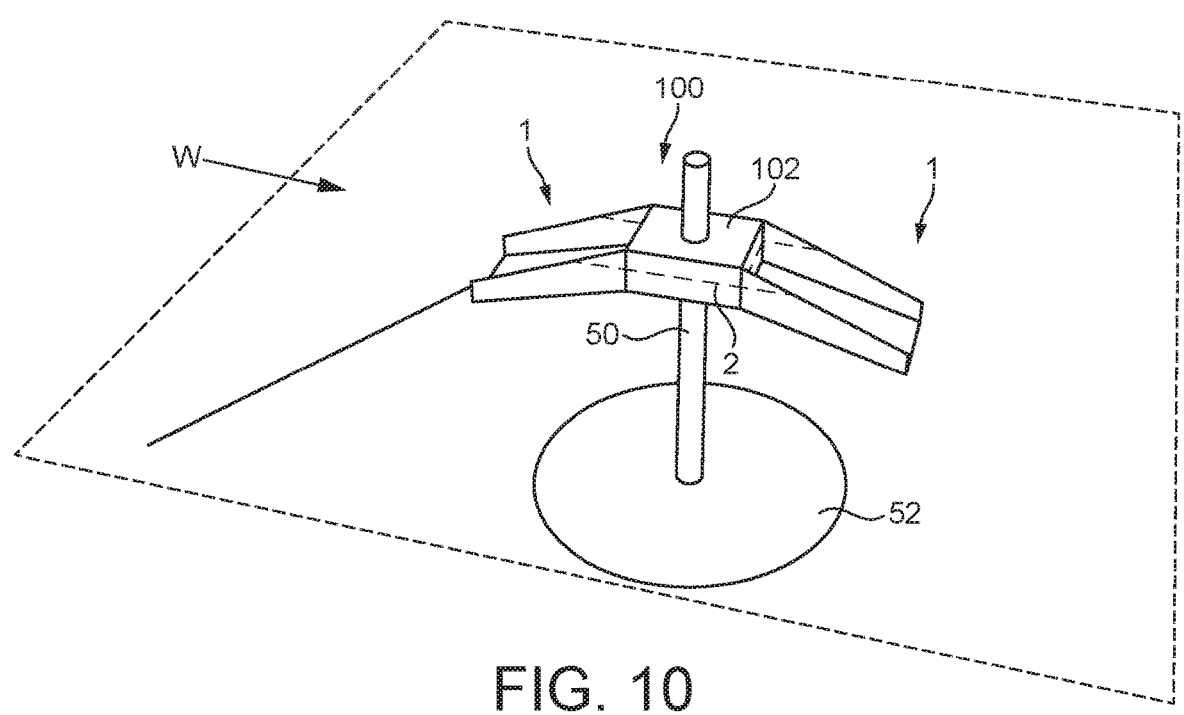
FIG. 10 is a schematic diagram of another heaving buoy WEC.
Figure 11:
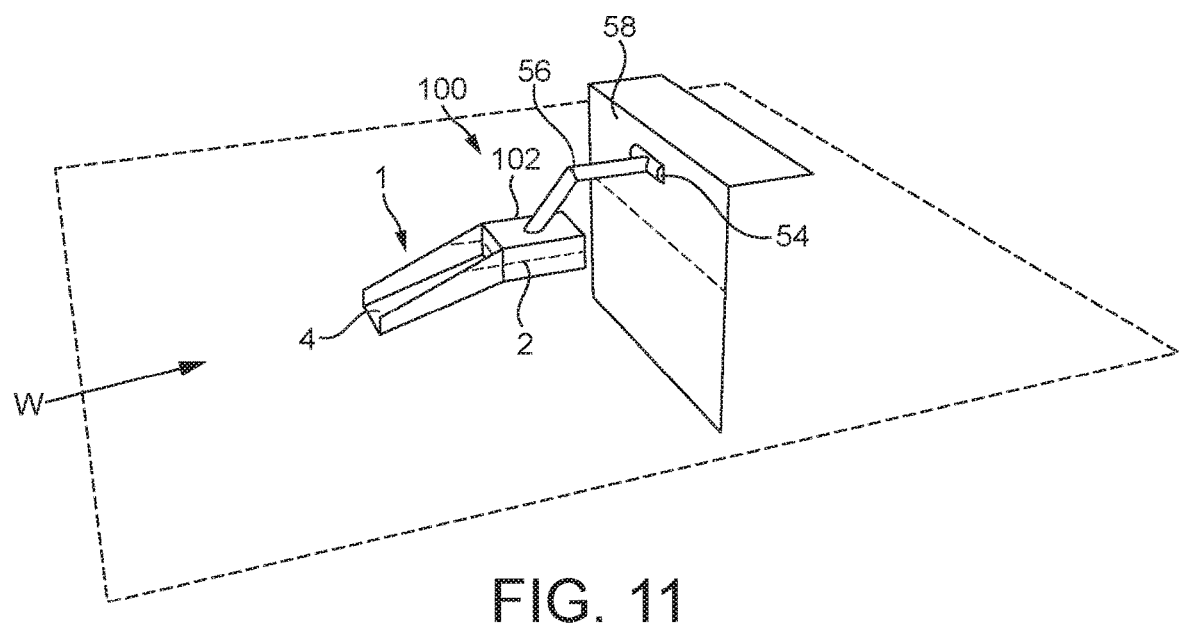
FIG. 11 is a schematic diagram of a heaving buoy wave energy converted attached to a sea wall.

FIG. 10 shows another heaving buoy WEC in which the floating body 100 has two channels 1, fore and aft, the connector is a pole 50 up and down which the WEC moves with wave motion and a generator or pump is provided within the body of the WEC. In the embodiment of FIG. 11, the floating body is connected through an arm 56 to an anchor in the form of a sea wall 58. The arm drives a generator or pump 54 to thereby provide human-usable energy extracted from the waves. As well as generating energy from heaving motion, such WECs may generate energy from surging motion and rotation (pitch), for example.

Thus, a WEC may be referenced to the sea floor, a wall or other anchor, or self-referenced (e.g. to a submerged but not fixed anchor connected to the floating body).

Figure 12A:
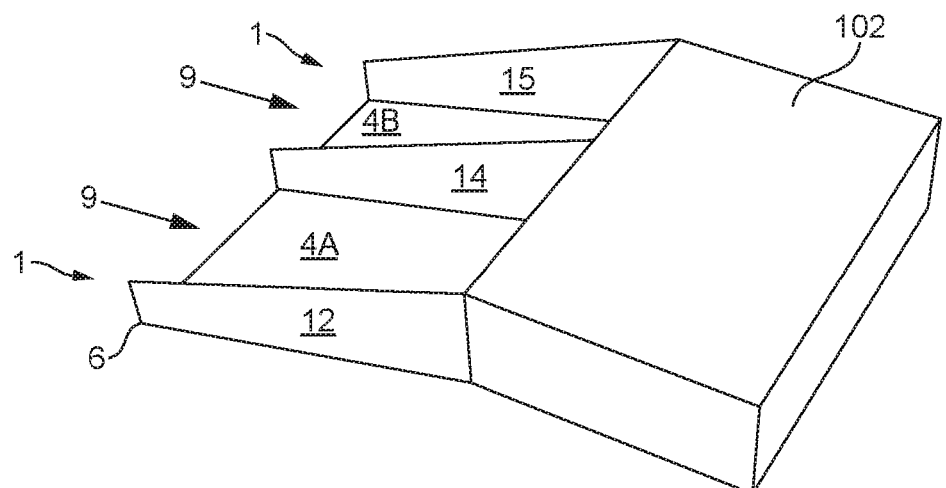
FIG. 12A is a perspective view, 12B is a plan view and 12C is a cross-section through a floating hull having a plurality of adjacent channels.
Figure 12B:
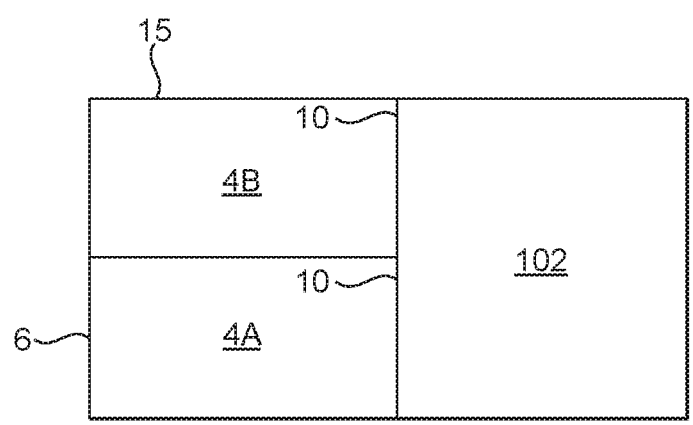
Figure 12C:
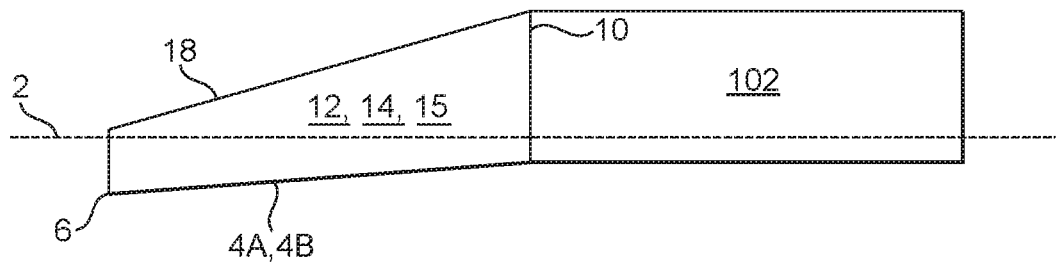

With reference to FIGS. 12A through 12C, a plurality of adjacent channels 1A, 1B, may be provided. As well as a first channel 1A having sloping base 4A and side walls 12, 14, there is a second adjacent channel with a further sloping base 4B, which shares side wall 14 with the first channel and has a further side wall 15. In this example, the channels have end walls 10. The channels may have different dimensions, for example in order to have different resonant wavelengths. They may for example have different beams, and or bases which slope at different angles.

Figure 13A:
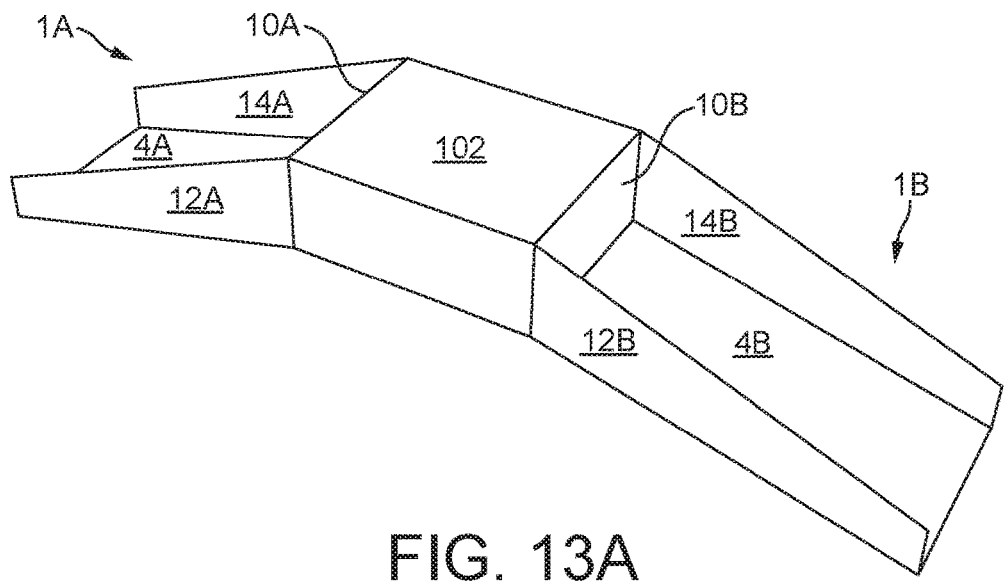
FIG. 13A is a perspective view, 13B is a plan view and 13C is a cross-section through a floating hull having channels at the fore and aft ends.
Figure 13B:
Figure 13C:
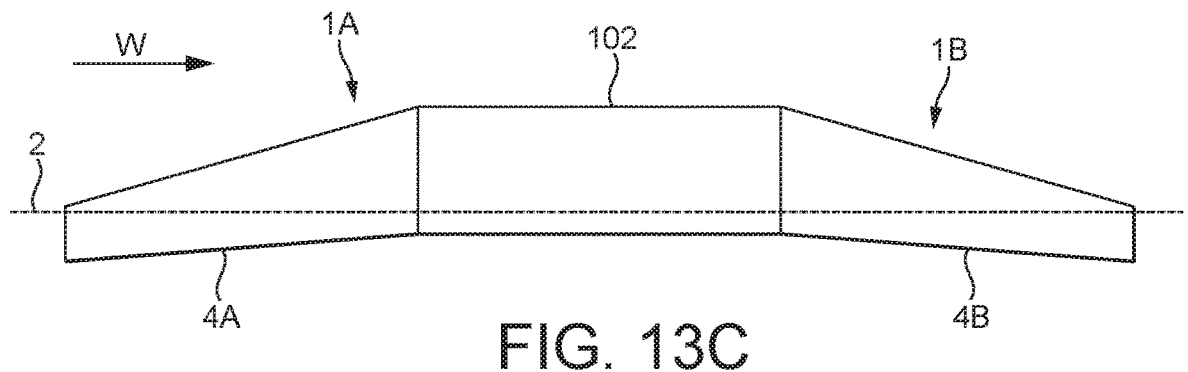
Figure 14:
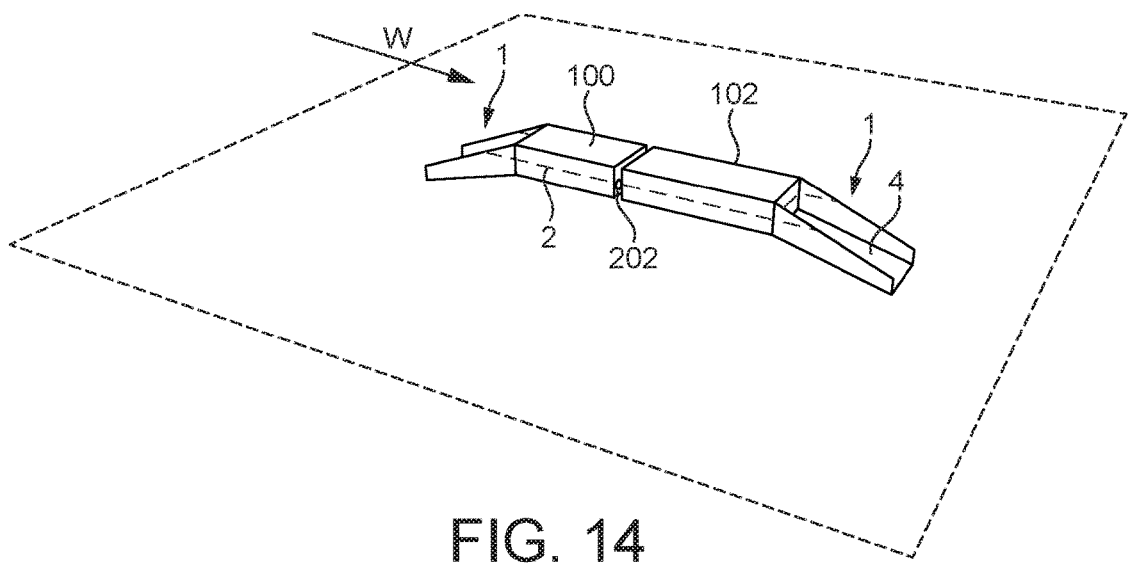
FIG. 14 is a perspective view of a hinged WEC having channels at the fore and aft ends.

FIGS. 13A through 13C, a plurality of channels 1A, 1B, are formed at opposite (fore, aft) ends of the buoyant component 102. Each has a respective sloping base 4A, 4B, side walls 12A, 12B opposite 14A, 14C respectively, and an end wall 10A, 10B. FIG. 14 shows a WEC based on this principle, with first and second buoyant hulls 102, 200 having channels at their fore and aft ends respectively, and a hinge 202 therebetween. As with the embodiment of FIG. 8, the hinge has a power take-off such as an electricity generator or pump.

Figure 15:
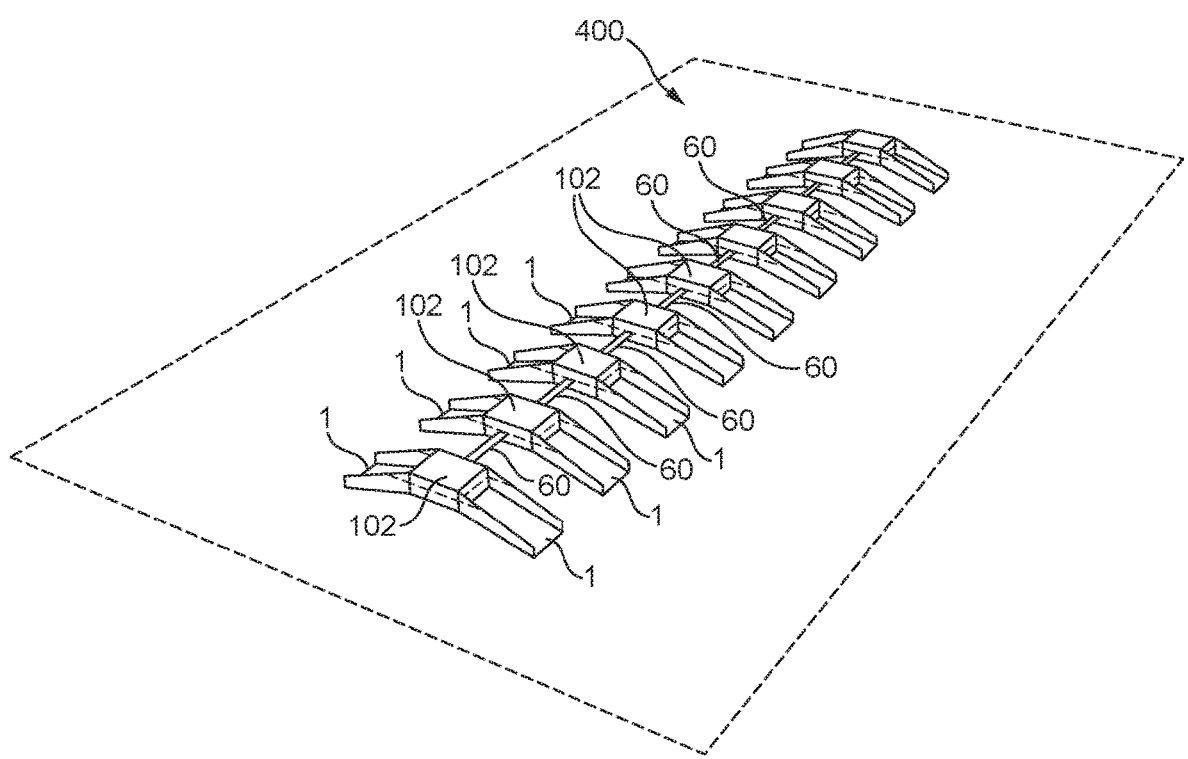
FIG. 15 is a perspective view of a WEC or breakwater installation.
Figure 16:
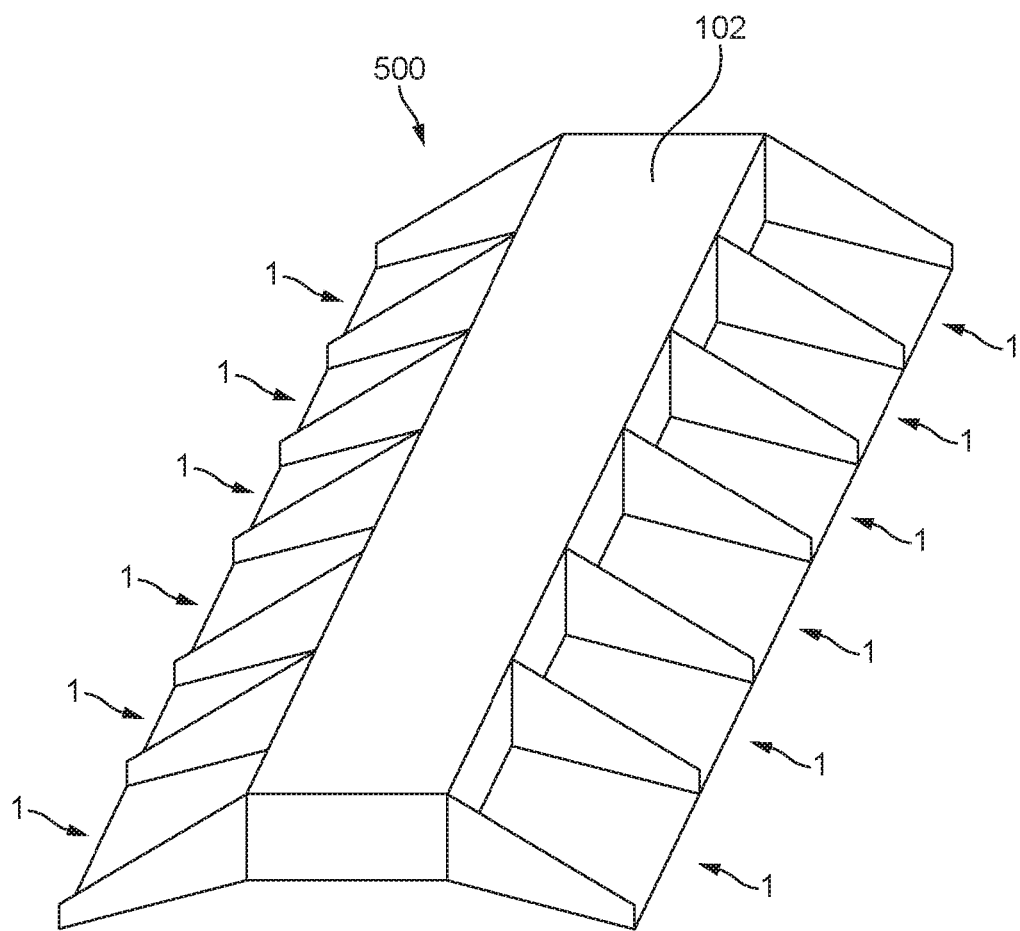
FIG. 16 is a perspective view of a floating breakwater.

In a practical implementation a plurality of WECs may be located adjacent to each other and typically parallel to extract energy from a broad front of waves. FIG. 15 shows an example of a floating WEC 400 formed from a plurality of floating hulls having channels according to the invention at fore and aft ends, and which are connected by rods 60, with power take-offs generating electricity or pumping fluid using the rotational motion of the floating hulls relative to each other.

As well as being useful for a WEC, such as a wave energy generator, channels according to the invention are useful as wave energy dissipaters, for example as floating (or sea-floor based) breakwaters, or in other context where it is advantageous to dissipate energy, such as floating booms, or around the hull of a ship or periphery of an oil platform, for example. Thus, the structure of FIG. 15 is also useful as a floating breakwater, in which the adjacent hulls are coupled with either fixed rods (without rotating joints) or with brakes (e.g. disc brakes) or other energy dissipating connections therebetween.

In a further example of a floating breakwater, an elongate, and potentially jointed, floating hull 102 has a plurality of channels 1 according to the invention, on either (or just one) side. The resonance effects in the channels extract energy efficiently from waves. Energy dissipation can be enhanced by the presence of joints which dissipate heat due to friction, drag plates, vanes or orifices, which dissipate energy hydrodynamically.

The wave energy dissipater causes the reflection of wave energy in respect of the waves received into the wave receiving channel or channels. The or each channel acts to create resonance, increasing the wave height within the channel with the result that the wave energy is reflected out of the channel in a different direction from the direction in which it entered the channel. This causes a decrease in the height of waves in the lee of the wave energy dissipater (i.e. the wave energy dissipater acts as a breakwater). One skilled in the art will appreciate that in this embodiment, energy is not dissipated as the wave energy is reflected, not absorbed.

Figure 17A:
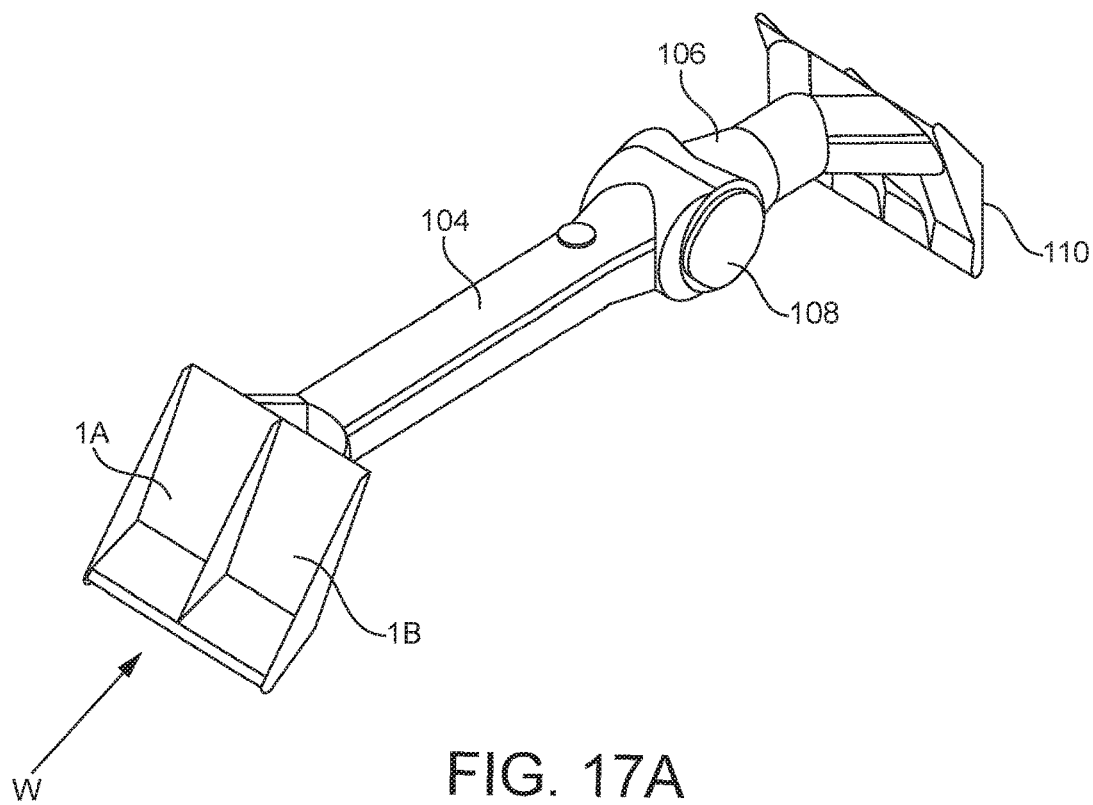
FIG. 17A is a perspective view of a further embodiment of a hinged WEC.
Figure 17B:
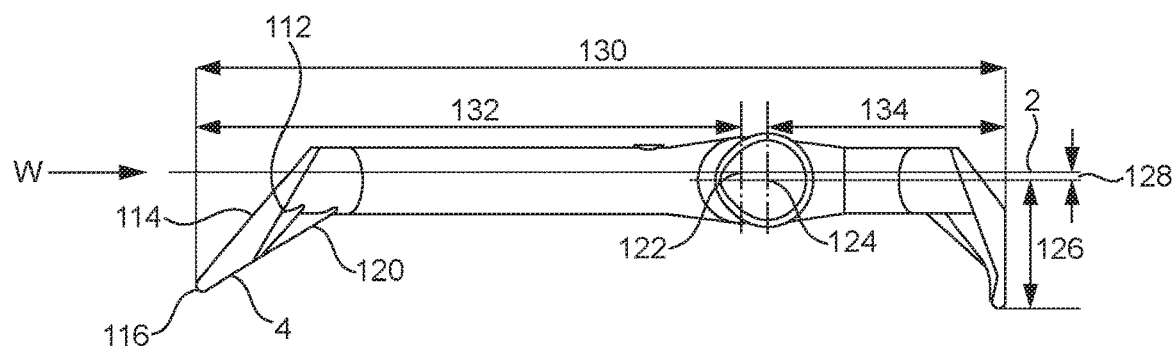
FIG. 17B is a cross-section through the hinged WEC of FIG. 17A
Figure 17C:
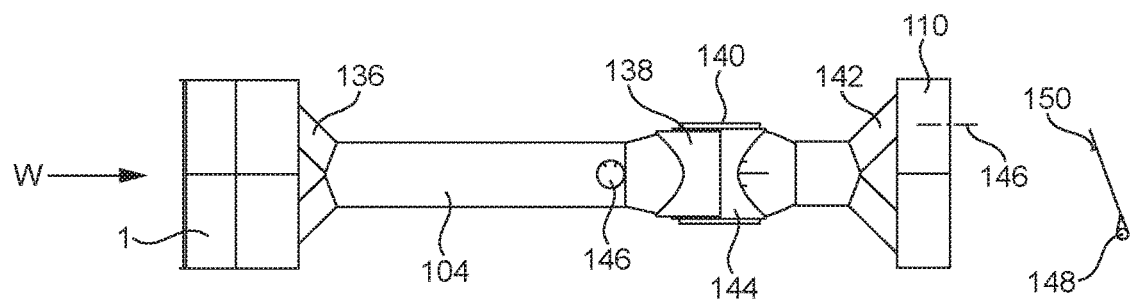
FIG. 17C is a plan view of the WEC of FIGS. 17A and 17B.
Figure 19:
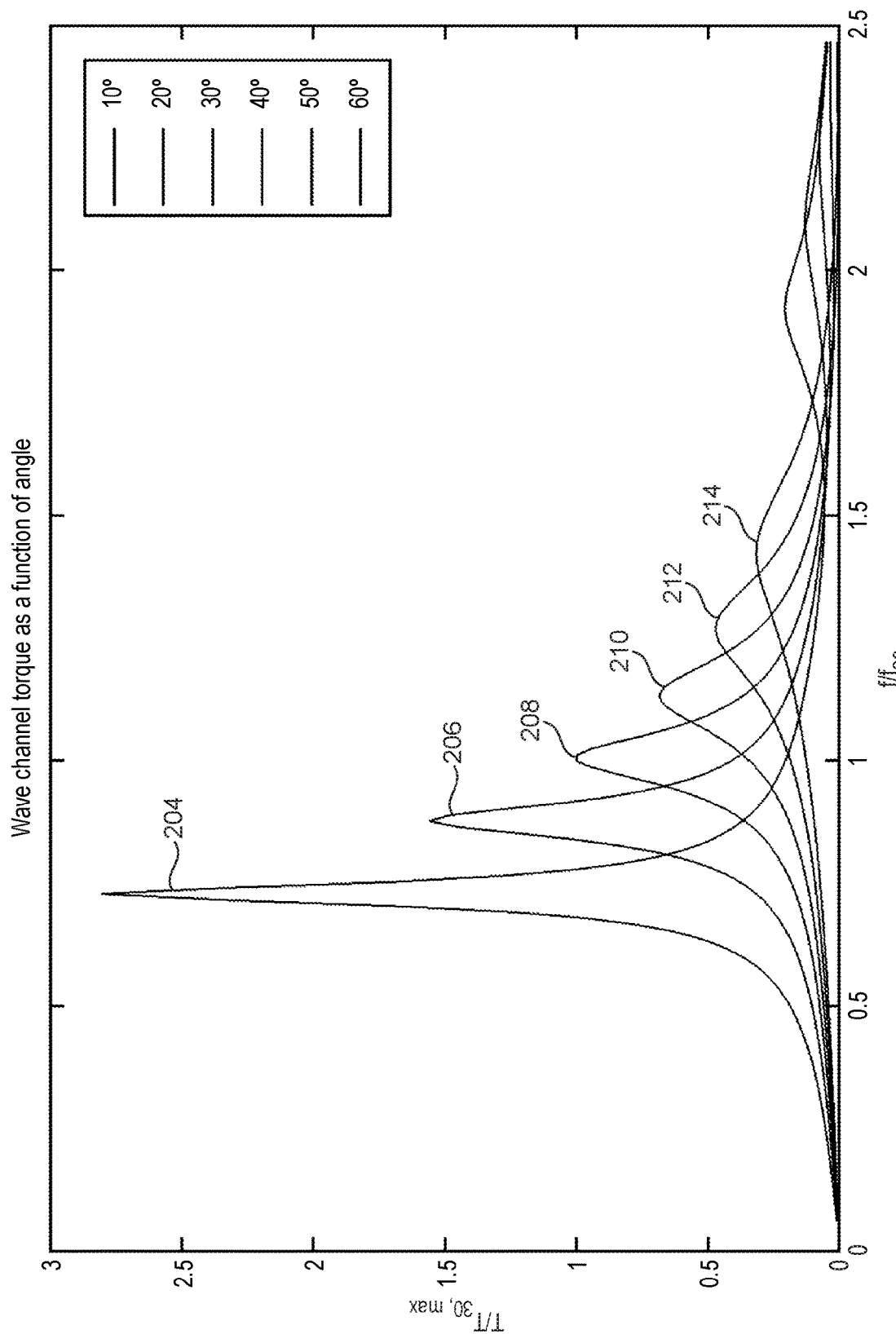
FIG. 19 is a plot of wave channel excitation torque at various wave channel angles.
Figure 20:
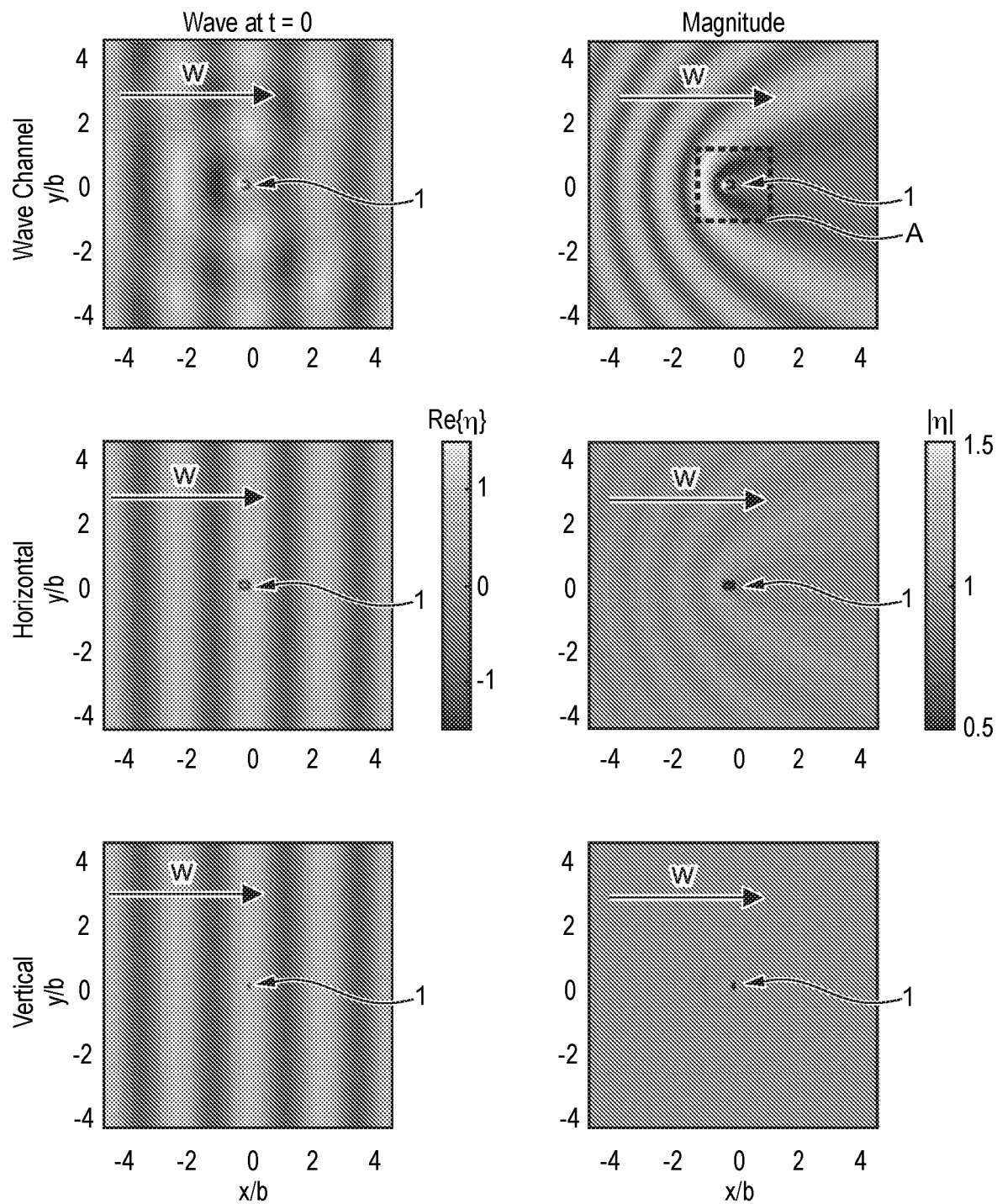
FIG. 20 illustrate the simulated effect of a (individual) channel with a sloping base on the surrounding wave field in comparison with the field around horizontal and vertical plates.

Turning now to FIGS. 17A-17C, a further example embodiment of the invention is a floating WEC having a first floating body (here in the form of a fore hull) 104 and a second floating body (here in the form of an aft hull) 106 joined by a hinge 108 (cross-sectional and plan views of this example embodiment can be seen in FIGS. 19 and 20, respectively). In this example, both the first floating body 104 and the second floating body 106 are buoyant. The first floating body 104 has two adjacent fore wave receiving channels 1A, 1B, the channels having a sloping base, a sloping end wall, and three side walls (including a common wall which functions as a side wall of each of the two adjacent channels) which thereby form the two adjacent channels 1A, 1B, into which (and out of which) water may flow in use. In this example, the second floating body 106 has an aft wave receiving channel 110, the channel having a sloping base and three side walls (however no distinct end wall) which forms two adjacent channels into which (and out of which) water may flow in use. The fore wave receiving channel 1 and the aft wave receiving channel 110 are not buoyant in this example, however in other examples they may be (e.g. at least partially) buoyant. The principal wave direction is indicated with arrow W.

One skilled in the art will appreciate that the choice of the angle of slope of both the base of both the aft wave receiving channel and the fore wave receiving channel will have an effect on the volume (and hence the mass) of fluid that may be received and therefor constrained by the channels, and therefore also on the resonant behaviour of the system. Accordingly, the geometry of the respective wave receiving channels will be influenced by the expected environment that the WEC is intended for use in, and the dynamics of the waves (e.g. frequency distribution, wave heights and water depth) expected in that environment.

As can be seen most clearly from FIG. 17B, this example embodiment wave receiving channel front stiffeners 114 and rear stiffeners 120 and a mooring attachment 116 on the first wave receiving channel (one skilled in the art will recognise that these are optional features which nevertheless may be included, for example, to improve the structural strength of the first wave receiving channel). The first floating body has a first length 132 and the second floating body has a second length 134 which make up the majority of the full length 130 of the WEC (the remaining length being made up from the hinge. The hinge is defined by a first floating body hinge axis 122 and a second floating body hinge axis 124, such that the first floating body can move rotationally relative to the second floating body and so that both floating bodies may be below the waterline 2, to a greater or lesser extent. The centre of the hinge is typically a first depth 128 below the waterline 2 and the second floating body typically extends a second depth 126 below the waterline (i.e. in use).

As can be seen most clearly from FIG. 17C, further optional features include a first Y-stiffener 136 of the first floating body and a second Y-stiffener 142 of the second floating body. The WEC further has an access hatch 146. The hinge has a first floating body nacelle 138 and a second floating body nacelle 144 as well as torque transfer plates 140. Line 146 indicates a cross section through the aft wave receiving channel, the view through that cross section indicated by feature 150, from which it can be seen that the aft wave receiving channel also has a channel lip.

Figure 18:
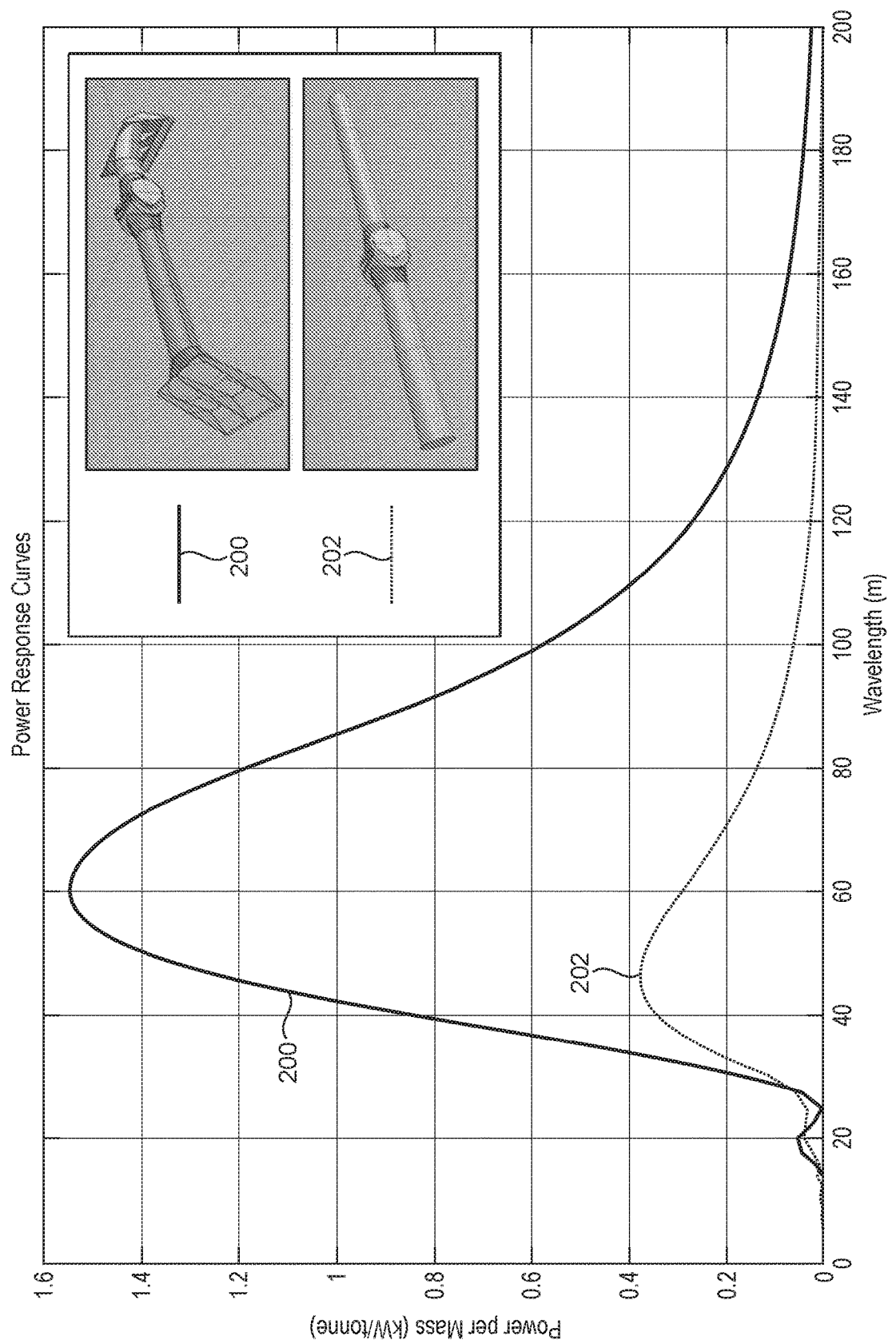
FIG. 18 is a plot of the power response curve of the embodiment of FIGS. 17A-17B compared to that of a standard raft.

In the example embodiments of FIGS. 17A-17C, waves may enter either the fore wave receiving channels 1A, 1B or the aft wave receiving channel 110. The force of waves on each channel causes the first floating body 104 to move relative to the second floating body 110. A power response curve for the embodiment of FIG. 17 can be seen in FIG. 18, compared to that of a standard raft. Table 1 below compares the predicted energy production of the embodiments of FIGS. 17A-17C, compared to that of a standard raft (The data of Table 1 relates to an example site in the North Sea). It has been found surprisingly that a WEC such as that shown in FIGS. 17A-17C may produce almost three times as much energy than a standard raft each year, despite being both smaller and lighter.

TABLE 1

|  | Length m | Mass tonne | Annual Energy Production MWh/year |
|---|---|---|---|
| Embodiment of FIG. 17 | 37 | 218 | 566 |
| Standard Raft | 49 | 245 | 189 |

In particular, in the embodiment of 17A-17C, the full length 130 of the WEC is 37 m (the first floating body has a first length 132 of 25 m and the second floating body has a second length 134 of 11 m, the remaining length being made up by the hinge). In comparison, a standard raft is typically 49 m in length. The angle of the slope of the sloping base of the wave receiving channel of the first floating body of the WEC is an important factor here, and modelling and experimentation have led to the choice of angle of slope of between 20° and 30°. The angle of the slope of the sloping base of the wave receiving channel of the second floating body is 70°.

In general, we have found that the resonance effects described herein pull wave energy from adjacent regions into the wave channels (this has the effect that the floating body has an incident wave cross-section greater than its physical cross-section perpendicular to the direction of wave travel). The wave height at the channel is increased and the resonances effect increases the forces on the floating bodies/hulls typically thereby increasing movement of the floating body.

Figure 21:
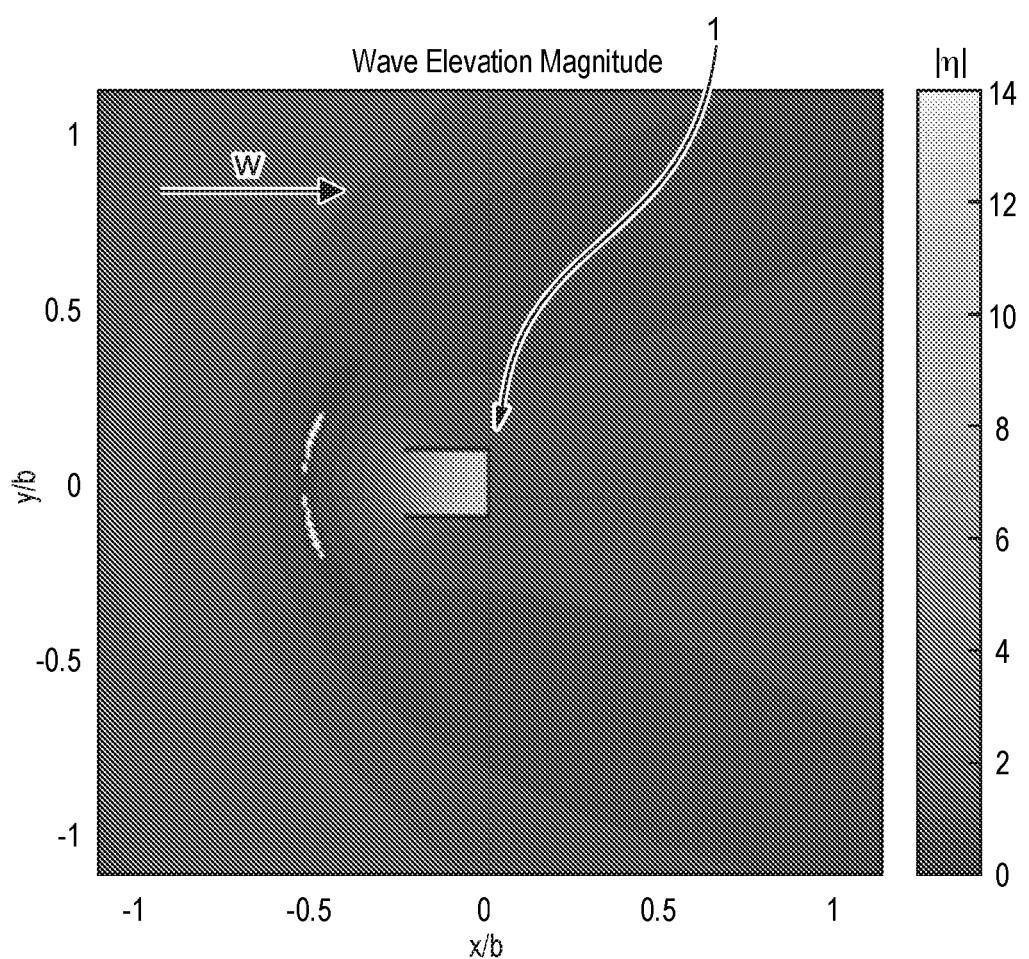
FIG. 21 is a close-up of region A around the channel.

FIGS. 20 and 21 illustrate the simulated effect of a (individual) channel with a sloping base on the surrounding wave field in the presence of parallel waves travelling from left to right. The scale of the right hand column is $|\eta|$ (normalised wave elevation) and of the left hand column is the real part of that. The first row shows the wave field around a wave channel according to the present invention. The second row shows the wave field around a non-wave channel geometry in the form of a horizontal plate with no depth. The third row shows the wave field around a non-wave channel geometry in the form of a vertical plate (orthogonal to the still water surface). As can be seen the wave channel creates a much larger disturbance in the wave field, due to wave resonance within the channel. In the first column this can be seen from the modulation of otherwise straight wave crests. The second column show the modulation with $|\eta|$ of 1 being uniform modulation. FIG. 21 is a close-up of region A around the channel. Clear resonance within the channel can be seen.

Figure 22:
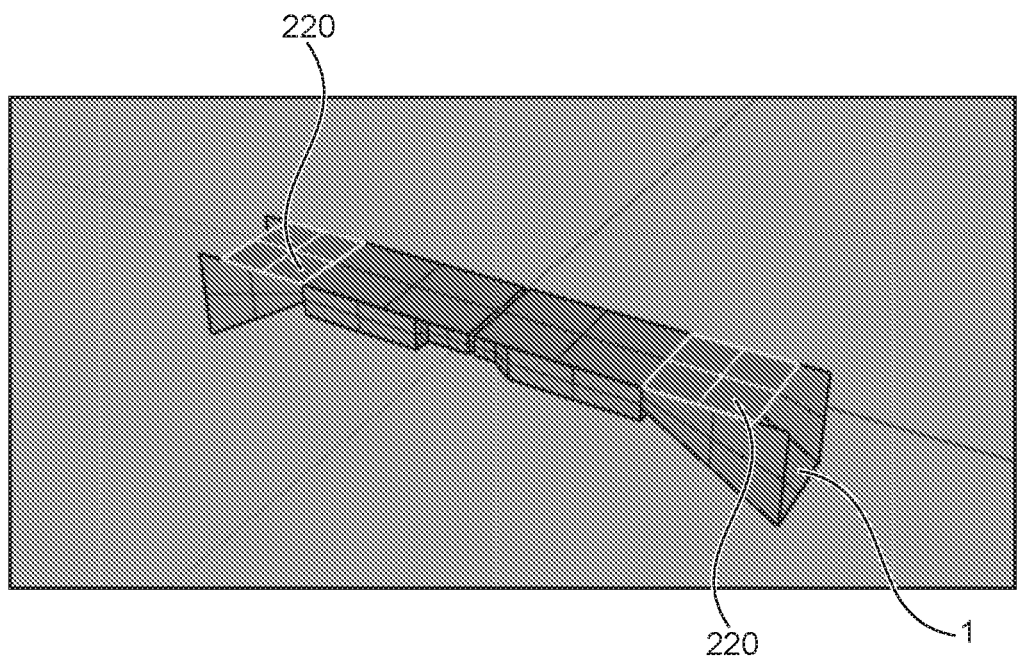
FIG. 22 is a diagram of an example embodiment of a WEC including damping plates.
Figure 23:
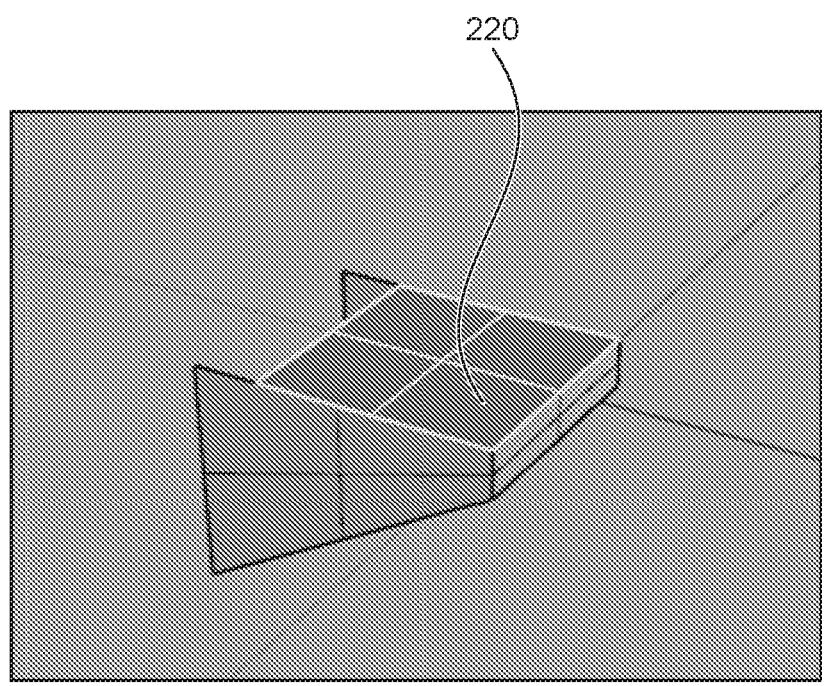
FIG. 23 is an example embodiment of a damping plate.

FIGS. 22 and 23 shows computer simulations of example embodiments of a WEC wherein the simulations have been provided with vertical damping plates 220 positioned above the or each wave channel 1. FIG. 22 shows an example embodiment of a WEC having a damping plate and FIG. 23 is a close up of a wave channel with a damping plate.

Such computer simulations are helpful for calculating the response of a WEC (including a damping plate) in the presence of water waves. In particular, it has been found that the provision of the damping plates is helpful in solving linear wave equations which otherwise predict resonant responses which are unrealistically large. In practice, such resonant responses have not been found. The addition of the damping plates to the simulations has the effect of providing solutions that are more realistic. In such simulations, the damping plate is treated as being substantially massless but as applying damping forces to water. In such simulations, they act to create a pressure on the water surface that thereby alters the flow of the water, damping the motion of the water. In some respects the damping plates may therefore be considered to be virtual plate.

Figure 24:
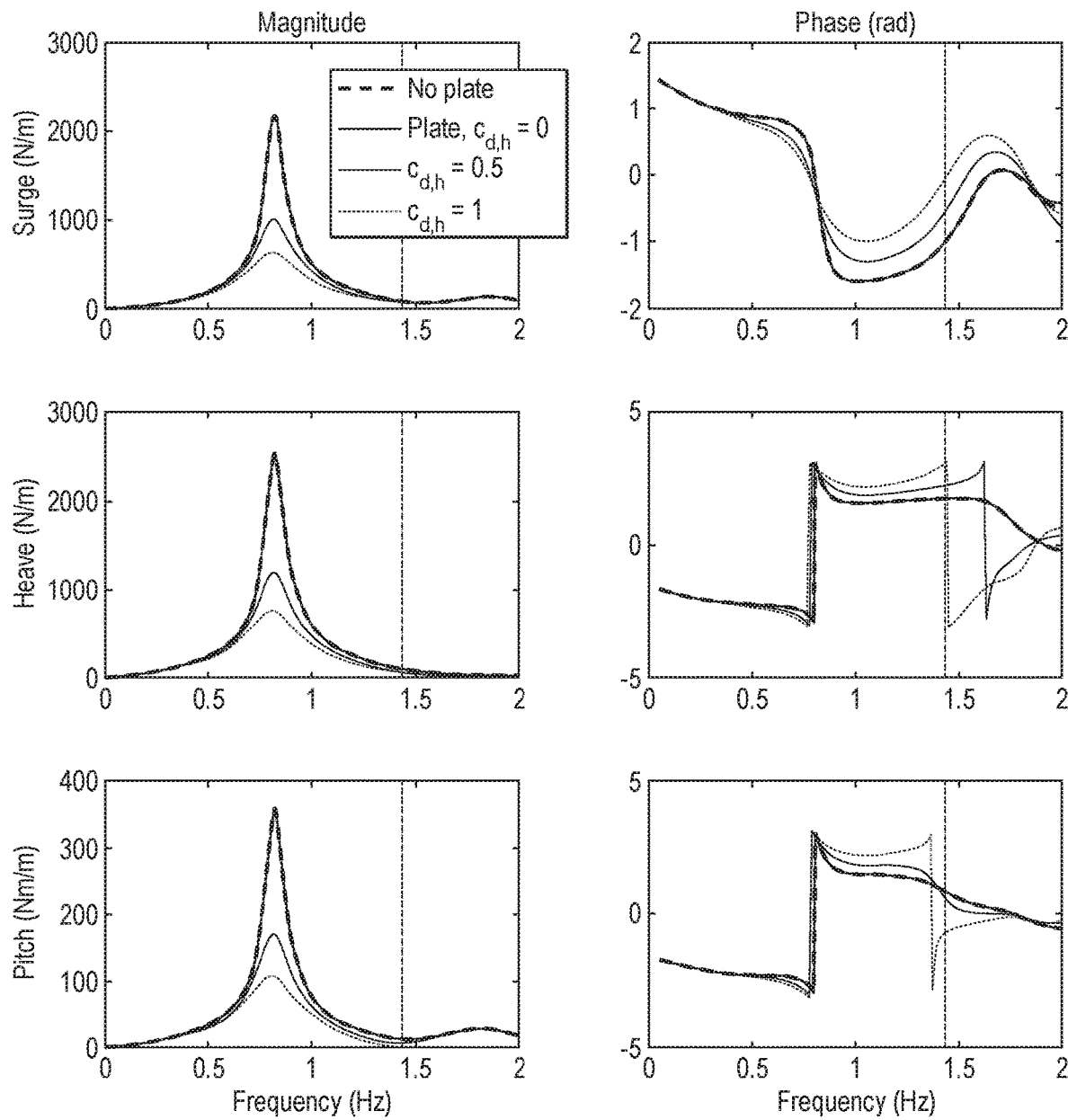
FIG. 24 is an array of plots indicating wave fields of an example wave channel compared to those of a horizontal plate and a vertical plate.

FIG. 24 is a series of plots indicating the predicted behaviour (i.e. behaviour predicted in a computer simulation) of a WEC both with and without a damping plate.

In WEC embodiments, the extracted energy is converted to another human-usable form using a power take-off such as an electricity generator, pump etc.

In energy dissipating embodiments, this extracted energy is primarily or entirely not used for a useful purpose but is instead dissipated, with the purpose of reducing wave intensity.

The dimensions of the channel, or channels, particularly the spacing between the side walls (the beam) may be selected depending on the location where the wave energy dissipater is to be installed. The properties of waves at the location, notably the average period between waves and/or the power spectral density of waves, are measured over a long period of time (e.g. a day, week, month or year). A channel with dimensions which will prove optimal at that location given the measured wave properties is then designed or selected from amongst a plurality of available configurations. In particular, the beam of the channel is typically determined as a fraction of the wavelength associated with the measured mean period between waves, taking into account measurements or simulations such as those shown in FIG. 5. Thus, wave energy extractors (such as WECs or dissipaters) may be provided with channels having different dimensions at different locations which have waves with different properties. For example, the beam of the channels at different locations may be a function of (e.g. proportional to) the wavelength associated with the mean period of waves at the various locations.

The invention claimed is:

1. A wave energy extractor comprising:
    a floating body having a wave receiving channel, the wave receiving channel having a sloping base and a wave receiving opening, both the sloping base and the wave receiving opening being provided between opposing first and second side walls, wherein at least part of the sloping base is configured to extend beneath a still water surface in a still water rest position,
    wherein the sloping base extends from an end wall of the wave receiving channel, the wave receiving channel being at least partly defined by the first and second side walls, the sloping base and the end wall,
    wherein the wave receiving channel has a channel resonant frequency at least partly defined by the sloping base, the first and second side walls and the end wall, and
    wherein the wave receiving channel is configured to cause resonance of waves that are received through the wave receiving opening, within a wavelength range, to thereby increase a quantity of wave energy extracted.

2. A wave energy extractor according to claim 1 wherein the channel is configured to cause resonance of waves received by the wave receiving channel through the wave receiving opening having the channel resonant frequency.

3. A wave energy extractor according to claim 2 wherein the wave receiving channel is configured to cause resonance of the waves, within a wavelength range, that are received through the wave receiving opening.

4. A wave energy extractor according to claim 1, wherein the ratio of the length of the sloping base, relative to the width of the channel, to the average distance between the opposing first and second side walls, is in the range 1 to 4 and/or wherein the ratio of the depth of the second end of the sloping base, relative to the still water rest position, to the average distance between the opposing first and second side walls, is in the ratio of 0.2 to 1.

5. A wave energy extractor according to claim 1, wherein the distance between the side walls is in the range of 0.8-16 m and/or wherein the sloping base extends upwards at a mean angle of 10° to 60° relative to the horizontal, when the wave energy extractor is at rest.

6. A wave energy extractor according to claim 1, installed in a body of water at a location receiving waves which have an annually averaged mean period, wherein the ratio of distance between the side walls to the wavelength corresponding to said mean period is in the range 1:10 to 1:50.

7. A wave energy extractor according to claim 1 wherein the sloping base is a first sloping base and the wave receiving channel is a first wave receiving channel, wherein the wave energy extractor further comprises a second wave receiving channel comprising a second sloping base provided between the first said side wall and a third side wall, the first and third side walls opposing each other, wherein at least part of the second sloping base is configured to extend beneath a still water surface in a still water rest position.

8. A wave energy extractor according to claim 7, wherein the second wave receiving channel has a second channel resonant frequency at least partly defined by the second sloping base and/or the first and third side walls, and wherein the second wave receiving channel is configured to cause resonance of waves received by the second channel and having the second channel resonant frequency.

9. A wave energy extractor according to claim 1 wherein the sloping base and the first and second side walls have longitudinal axes which extend in a first direction, wherein the floating body has a further wave receiving channel comprising a further sloping base and further wave receiving opening, both the further sloping base and the further wave receiving opening being provided between a further pair of opposing side walls, at least a portion of the further sloping base extending beneath the still water surface in the still water rest position, wherein the further sloping base and the further pair of side walls have longitudinal axes which extend in a second direction different from the first direction.

10. A wave energy extractor according to claim 9 wherein the further channel has a further channel resonant frequency at least partly defined by the further sloping base and/or the further pair of walls, and wherein the further channel is configured to cause resonance of waves received by the further channel through a wave receiving opening thereof and having the further channel resonant frequency.

11. A floating breakwater comprising the wave energy extractor of claim 1, wherein the wave energy extractor is a wave energy dissipater.

12. A wave energy extractor according to claim 1 comprising the floating body and a further floating body to which it is connected by a joint and the WEC generates energy from the relative movement of the first and second floating bodies.

13. A wave energy extractor according to claim 1, wherein the sloping base extends upwards at a mean angle of 10° to 70° relative to the horizontal, when the wave energy extractor is at rest and/or wherein the sloping base is substantially parallel to the horizontal when the wave energy extractor is at rest.

14. A method of extracting wave energy, the method comprising:
providing a floating body having a wave receiving channel, the wave receiving channel having a sloping base and a wave receiving opening, both the sloping base and wave receiving opening being provided between opposing first and second side walls, wherein at least part of the sloping base is configured to extend beneath a still water surface in a still water rest position; and
the channel receiving waves through the wave receiving opening, causing resonance of the received waves to thereby extract wave energy;
wherein the sloping base extends from an end wall of the wave receiving channel, the wave receiving channel being at least partly defined by the first and second side walls, the sloping base and the end wall,
wherein the wave receiving channel has a channel resonant frequency at least partly defined by the sloping base, the first and second side walls and the end wall, and
wherein the wave receiving channel is configured to cause resonance of waves that are received through the wave receiving opening, within a wavelength range, to thereby increase a quantity of wave energy extracted.

15. A method according to claim 14, comprising the initial step of measuring properties of the waves at a location, averaged over a period of time, and selecting the floating body and/or the wave channel from amongst a plurality of possible floating bodies and/or wave channels having different configuration taking into account the measured properties.

16. A method according to claim 15, comprising measuring properties of the waves at a first location and a second location, the second location having a wavelength corresponding to the mean period between waves, at a greater wavelength than at the first location, and installing a wave energy extractor comprising a said floating body at each of the first location and the second location, wherein the distance between the opposing first and second side walls of the channel of the floating body installed at the first location is greater than the distance between the opposing first and second side walls of the channel of the floating body installed at the second location.

17. A method according to claim 15, comprising fitting a wave channel attachment, which comprises the wave receiving channel, side walls and sloping base, to a floating body.

18. Apparatus comprising:
a buoyant hull tethered to an anchor, the buoyant hull having a wave receiving channel comprising a sloping base and a wave receiving opening, at least part of the sloping base extending beneath a still water surface in a still water rest position, the wave receiving channel being configured such that incoming waves received by the channel through the wave receiving opening cause the body to move relative to the anchor to thereby extract wave energy;
wherein the sloping base extends from an end wall of the wave receiving channel, the wave receiving channel being at least partly defined by opposing first and second side walls, the sloping base and the end wall,
wherein the wave receiving channel has a channel resonant frequency at least partly defined by the sloping base, the first and second side walls and the end wall, and
wherein the wave receiving channel is configured to cause resonance of waves that are received through the wave receiving opening, within a wavelength range, to thereby increase a quantity of wave energy extracted.

19. Apparatus according to claim 18 wherein the anchor is suspended in a body of water under the buoyant hull and/or wherein the anchor comprises the floor of a body of water containing the buoyant hull and/or wherein the anchor is a structure which is adjacent the buoyant hull.

20. Apparatus according to claim 18 wherein the wave receiving channel has a resonant frequency such that waves received by the wave receiving channel through the wave receiving opening and having the resonant frequency resonate in the wave receiving channel to thereby cause the buoy to move relative to the anchor to thereby drive the energy extraction.

21. A method of generating or storing power, the method comprising:
   providing a buoyant hull tethered to an anchor provided beneath the buoyant hull, the buoyant hull having a wave receiving channel comprising a sloping base and a wave receiving opening, at least part of the sloping base being configured to extend beneath a still water surface in a still water rest position; and
   incoming waves being received by the wave receiving channel through the wave receiving opening, thereby causing the buoyant hull to move relative to the anchor to thereby extract wave energy from the waves to thereby generate or store power;
   wherein the sloping base extends from an end wall of the wave receiving channel, the wave receiving channel being at least partly defined by opposing first and second side walls, the sloping base and the end wall,
   wherein the wave receiving channel has a channel resonant frequency at least partly defined by the sloping base, the first and second side walls and the end wall, and
   wherein the wave receiving channel is configured to cause resonance of waves that are received through the wave receiving opening, within a wavelength range, to thereby increase a quantity of wave energy extracted.

22. A wave energy extractor comprising a floating body having a wave receiving channel, the wave receiving channel having a sloping base and a wave receiving opening, both the sloping base and the wave receiving opening being provided between opposing first and second side walls, wherein at least part of the sloping base is configured to extend beneath a still water surface in a still water rest position;
   wherein the sloping base extends from an end wall of the wave receiving channel, the wave receiving channel being at least partly defined by the first and second side walls, the sloping base and the end wall,
   wherein the end wall extends upwards from the upper end of the sloping base at a mean angle of at least 50°, and
   wherein the wave receiving channel is configured to cause resonance of waves that are received through the wave receiving opening, within a wavelength range, to thereby increase a quantity of wave energy extracted.

* * * * *